(12) United States Patent
Grau Besoli et al.

(10) Patent No.: US 8,085,199 B2
(45) Date of Patent: Dec. 27, 2011

(54) RECEIVER INCLUDING A MATRIX MODULE TO DETERMINE ANGULAR POSITION

(75) Inventors: Alfred Grau Besoli, Irvine, CA (US); Nicolaos G. Alexopoulos, Irvine, CA (US); Jesus Castaneda, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 54 days.

(21) Appl. No.: 12/475,484

(22) Filed: May 30, 2009

(65) Prior Publication Data
US 2010/0151784 A1     Jun. 17, 2010

Related U.S. Application Data

(60) Provisional application No. 61/122,365, filed on Dec. 13, 2008.

(51) Int. Cl.
*G01S 3/00* (2006.01)
(52) U.S. Cl. ........................................ 342/373
(58) Field of Classification Search .................. 342/373
See application file for complete search history.

(56) References Cited

U.S. PATENT DOCUMENTS

| | | | |
|---|---|---|---|
| 3,729,742 A | 4/1973 | Boyns | |
| 4,316,192 A | 2/1982 | Acoraci | |
| 4,555,706 A | 11/1985 | Haupt | |
| 5,924,020 A * | 7/1999 | Forssen et al. | 455/129 |
| 7,843,387 B2 * | 11/2010 | Shamsaifar et al. | 342/373 |
| 2008/0117105 A1 | 5/2008 | Chen et al. | |

FOREIGN PATENT DOCUMENTS

WO     2005117207 A2     12/2005

* cited by examiner

*Primary Examiner* — Harry Liu
(74) *Attorney, Agent, or Firm* — Garlick, Harrison & Markison; Kevin L. Smith

(57) ABSTRACT

A receiver includes an antenna array, a plurality of phase shifters, a matrix module, a low noise amplifier module, and a down conversion module. The antenna array is operably coupled to receive an inbound wireless signal. The plurality of phase shifters is operably coupled to the antenna array and to produce a plurality of phase shifted inbound wireless signals. The matrix module is operably coupled to beamform the plurality of phase shifted inbound wireless signals to produce a plurality of beamformed and phase shifted inbound wireless signals. The low noise amplifier module is operably coupled to amplify one or more of the plurality of beamformed and phase shifted inbound wireless signals to produce one or more amplified inbound signals. The down conversion module is operably coupled to convert the one or more amplified inbound wireless signals into one or more baseband or near baseband signals.

10 Claims, 18 Drawing Sheets

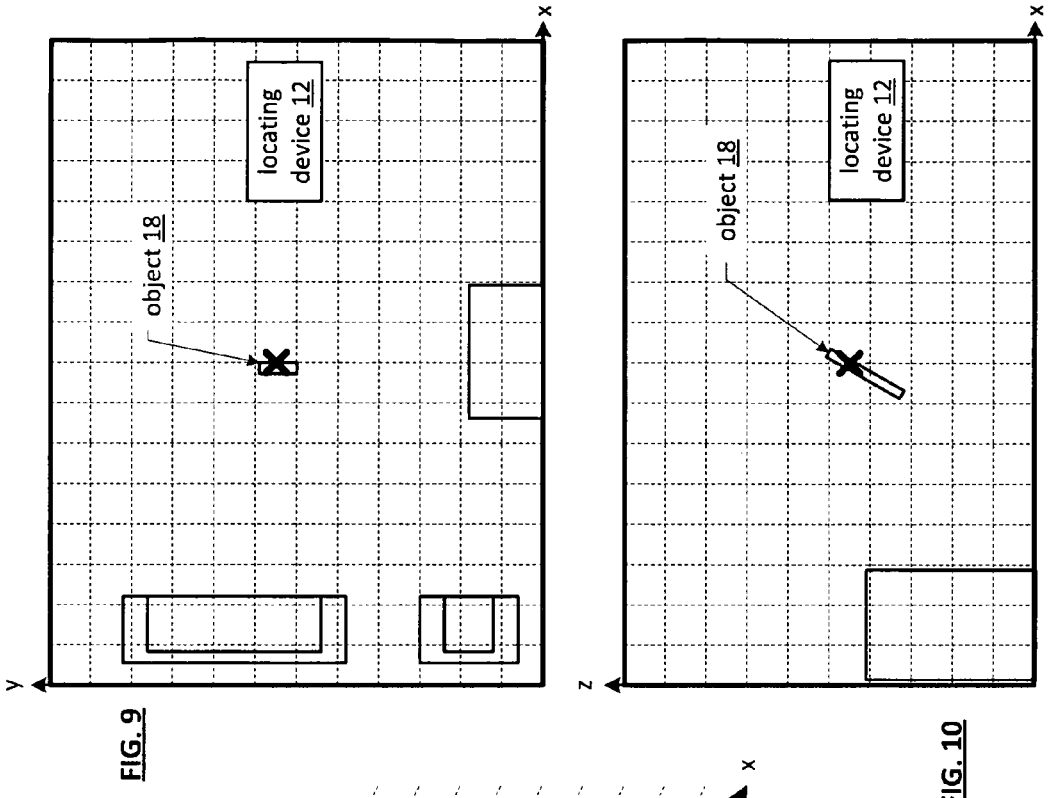
FIG. 9
FIG. 10
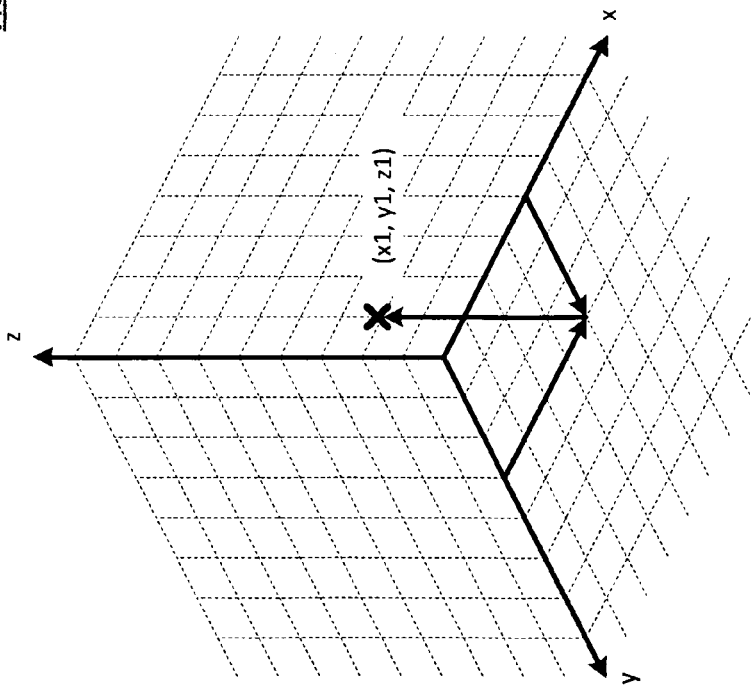
FIG. 8

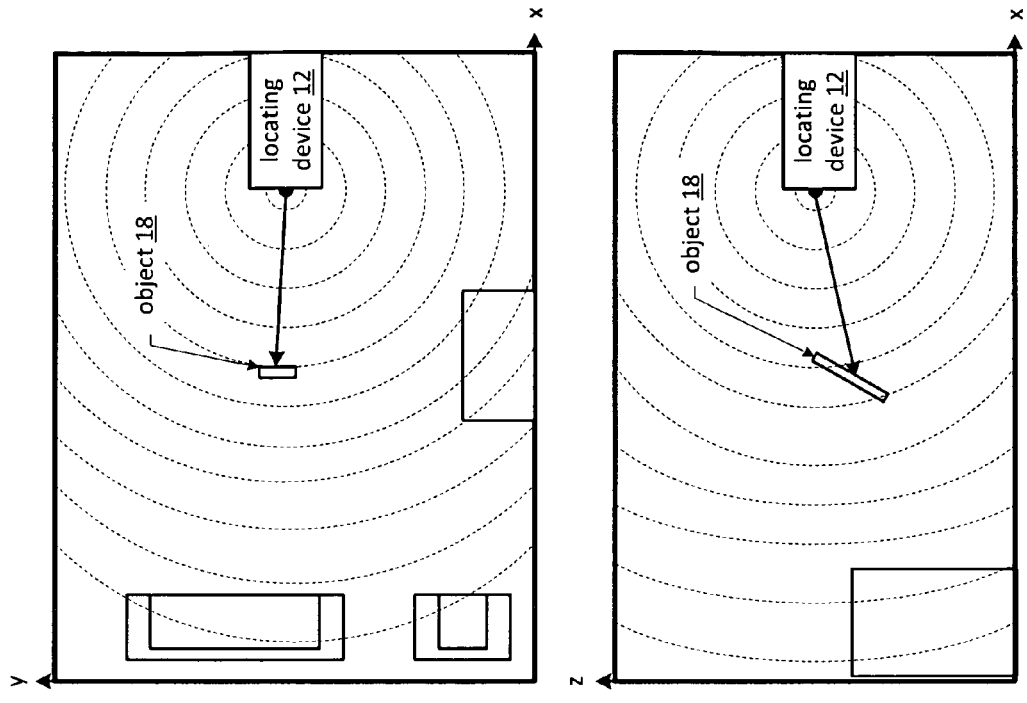
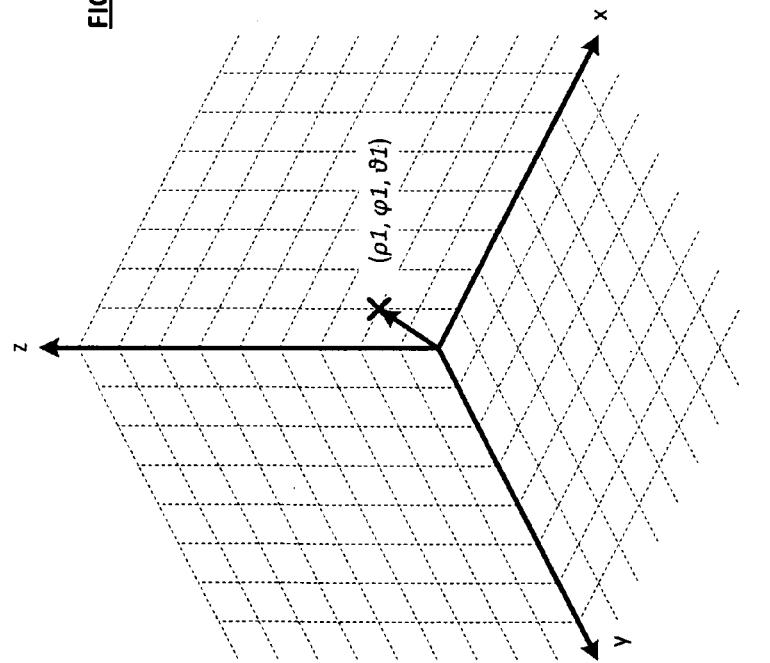
FIG. 12
FIG. 13
FIG. 11

RECEIVER INCLUDING A MATRIX MODULE TO DETERMINE ANGULAR POSITION

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:
1. U.S. Provisional Application Ser. No. 61/122,365, entitled SUM AND DIFFERENCE ANTENNA STRUCTURE AND OPERATIONS, filed Dec. 13, 2008.

This patent application is related to co-pending U.S. patent application Ser. No. 12/475,479 entitled RECEIVER UTILIZING MULTIPLE RADIATION PATTERNS TO DETERMINE ANGULAR POSITION, filed May 30, 2009, pending.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless systems and more particularly to determining position within a wireless system and/or tracking motion within the wireless system.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, radio frequency (RF) wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multipoint distribution systems (LMDS), multi-channel-multipoint distribution systems (MMDS), and/or variations thereof. As another example, infrared (IR) communication systems may operate in accordance with one or more standards including, but not limited to, IrDA (Infrared Data Association).

Depending on the type of RF wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each RF wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In most applications, radio transceivers are implemented in one or more integrated circuits (ICs), which are inter-coupled via traces on a printed circuit board (PCB). The radio transceivers operate within licensed or unlicensed frequency spectrums. For example, wireless local area network (WLAN) transceivers communicate data within the unlicensed Industrial, Scientific, and Medical (ISM) frequency spectrum of 900 MHz, 2.4 GHz, and 5 GHz. While the ISM frequency spectrum is unlicensed there are restrictions on power, modulation techniques, and antenna gain.

In IR communication systems, an IR device includes a transmitter, a light emitting diode, a receiver, and a silicon photo diode. In operation, the transmitter modulates a signal, which drives the LED to emit infrared radiation which is focused by a lens into a narrow beam. The receiver, via the silicon photo diode, receives the narrow beam infrared radiation and converts it into an electric signal.

IR communications are used in video games to detect the direction in which a game controller is pointed. As an example, an IR sensor is placed near the game display, where the IR sensor detects the IR signal transmitted by the game controller. If the game controller is too far away, too close, or angled away from the IR sensor, the IR communication will fail.

Further advances in video gaming include three accelerometers in the game controller to detect motion by way of acceleration. The motion data is transmitted to the game console via a Bluetooth wireless link. The Bluetooth wireless link may also transmit the IR direction data to the game console and/or convey other data between the game controller and the game console.

While the above technologies allow video gaming to include motion sensing, it does so with limitations. As mentioned, the IR communication has a limited area in which a player can be for the IR communication to work properly. Further, the accelerometer only measures acceleration such that true one-to-one detection of motion is not achieved. Thus, the gaming motion is limited to a handful of directions (e.g., horizontal, vertical, and a few diagonal directions).

Therefore, a need exists for improved motion tracking and positioning determination for video gaming and other applications.

BRIEF SUMMARY OF THE INVENTION

The present invention is directed to apparatus and methods of operation that are further described in the following Brief Description of the Several Views of the Drawing(s), the Detailed Description of the Drawings, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIGS. 8-10 are diagrams of an embodiment of a coordinate system of a system in accordance with the present invention;

FIGS. 11-13 are diagrams of another embodiment of a coordinate system of a system in accordance with the present invention;

DETAILED DESCRIPTION OF THE DRAWINGS

Figure 1:
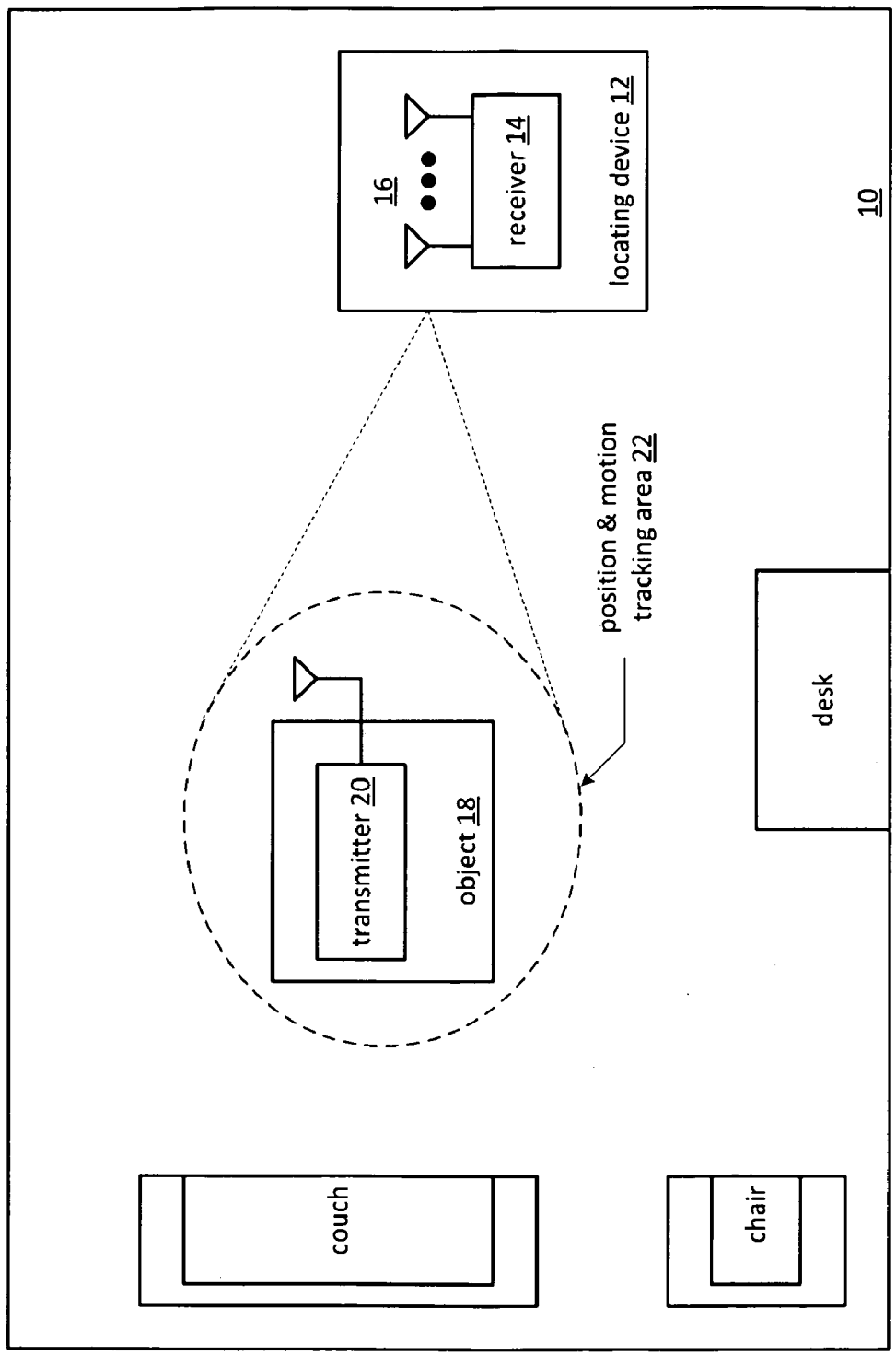
FIG. 1 is a schematic block diagram of an overhead view of an embodiment of a location system in accordance with the present invention.

FIG. 1 is a schematic block diagram of an overhead view of an embodiment of a location system 10 that includes a locating device 12 and transmitter 20 associated with an object 18 (e.g., a person, a device, an item, etc.). The locating device 12 includes a receiver 14, which, in turn, has an antenna array 16. The location system 10 is within an environment, which may be a room, portion of a room, and/or any other space where the object and the locating device can be proximally co-located (e.g., airport terminal, on a bus, on an airplane, etc.).

In operation, the locating device 12, via the receiver 14, may determine its environment by sweeping the area with one or more signals within one or more frequency bands. For example, the one or more signals may be in the ultrasound frequency band of 20 KHz to 200 MHz, the radio frequency band of 30 HZ to 3 GHz, the microwave frequency band of 3 GHz to 300 GHz, the infrared (IR) frequency band of 300 GHz to 428 THz, the visible light frequency band of 428 THz to 750 THz ($n \times 10^{12}$), the ultraviolet radiation frequency band of 750 THz to 30 PHz ($n \times 10^{15}$), and/or the X-Ray frequency band of 30 PHz to 30 EHz ($n \times 10^{18}$).

The determination of the environment continues with the locating device 12 measuring at least one of: reflection of the one or more signals, absorption of the one or more signals, refraction of the one or more signals, pass through of the one or more signals, angle of incident of the one or more signals, backscattering of the one or more signals, magnetization induced by the one or more signals to produce measured signal effects, and/or transmissions by transmitters (e.g., transmitter 20) located within the environment. The locating device 12 then identifies different objects based on the measured signal effects (e.g., inanimate objects have different reflective, absorption, pass through, and/or refractive properties of the one or more signals than animate beings) and specific objects associated with transmitters 20.

The locating device 12 then determines distance of the different objects 18 with respect to itself. From this data, the locating device 12 generates a three-dimensional topographic map of the area in which it resides to produce the environment. In this example, the environment includes the object 18, a couch, a chair, a desk, the four encircling walls, the floor, and the ceiling.

Having determined the environment, the locating device 12 maps the environment to a coordinate system (e.g., a three-dimensional Cartesian coordinate system [x, y, x], a spherical coordinate system [$\rho$, $\phi$, $\theta$], etc.). The locating device 12 then determines the position 22 of the object 18 within the gaming environment in accordance with the coordinate system.

Once the object's position is determined, the locating device tracks its motion. For example, the locating device 12 may determine the position of the object 20 within a positioning tolerance (e.g., within a meter) at a positioning update rate (e.g., once every second or once every few seconds) and tracks the motion within a motion tracking tolerance (e.g., within a few millimeters) at a motion tracking update rate (e.g., once every 10-100 milliseconds).

Figure 2:
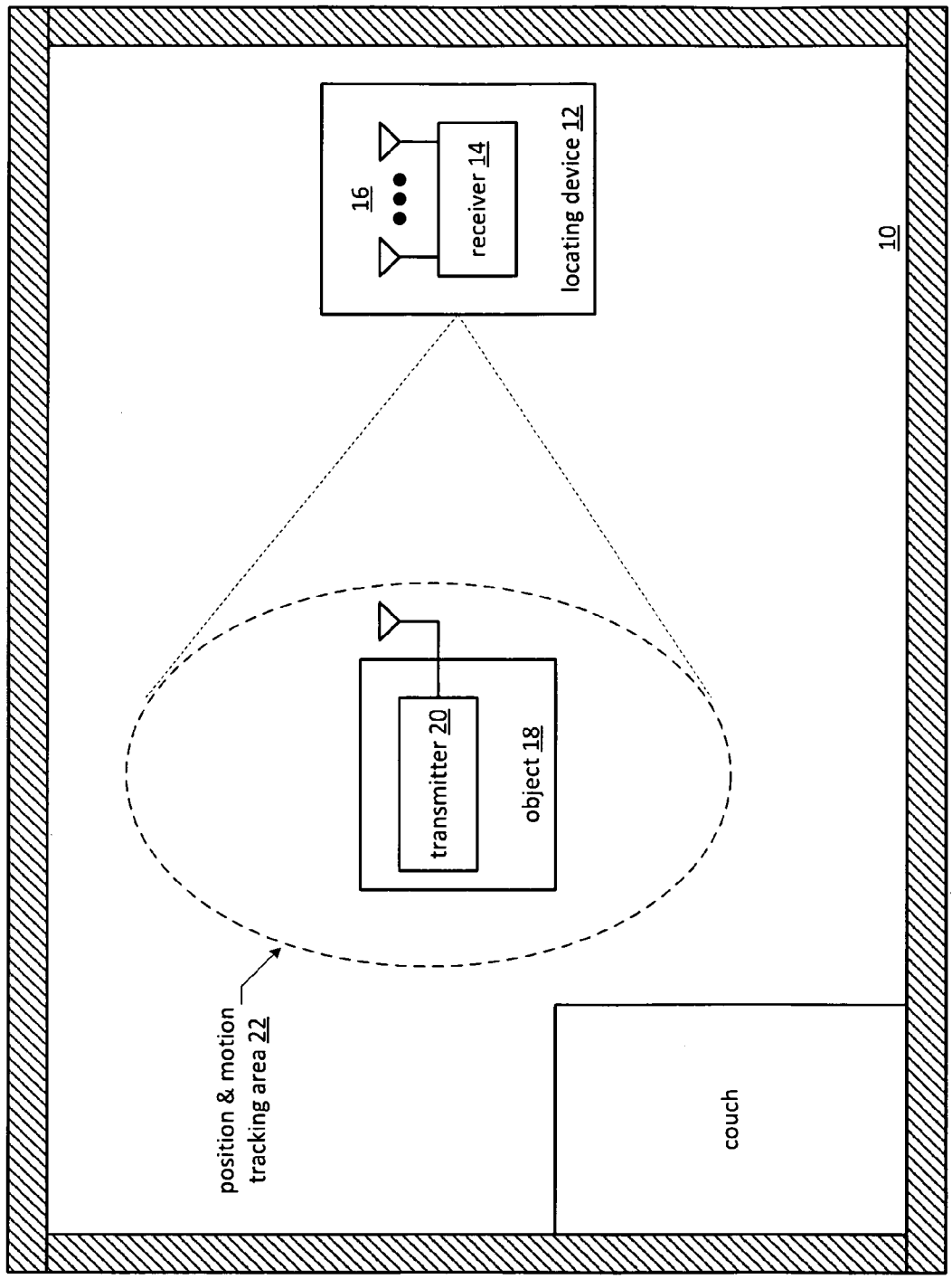
FIG. 2 is a schematic block diagram of a side view of an embodiment of a location system in accordance with the present invention.

FIG. 2 is a schematic block diagram of a side view of an embodiment of a location system 10 of FIG. 1 to illustrate that the position and motion tracking are done in three-dimensional space. Since the locating device 12 does three-dimensional positioning and motion tracking, the initial distance and/or angle of the object 18 to the locating device 12 is a negligible factor. As such, the locating system 10 provides accurate motion tracking of the object 18.

Figure 3:
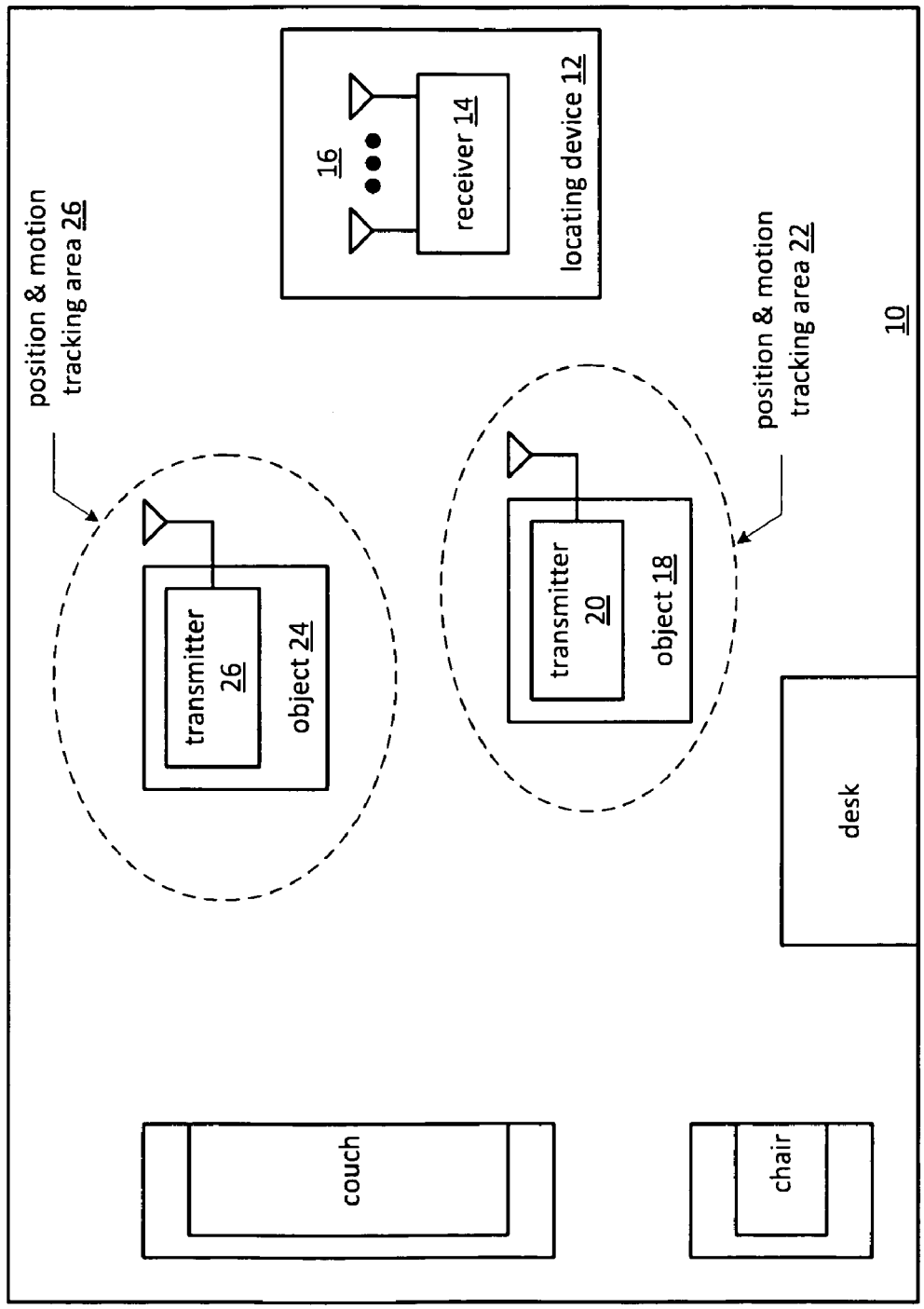
FIG. 3 is a schematic block diagram of an overhead view of another embodiment of a location system in accordance with the present invention.

FIG. 3 is a schematic block diagram of an overhead view of another embodiment of a location system 10 that includes a locating device 12 and a plurality of transmitters 20 & 26, each associated with an object 18 & 24 of a plurality of objects (e.g., a person, a device, an item, etc.). The location system is within an environment, which may be a room, portion of a room, and/or any other space where the object and the locating device can be proximally co-located (e.g., airport terminal, on a bus, on an airplane, etc.).

In operation, the locating device 12 may determine its environment as previously discussed and determines the position of each the objects 18 & 24 via the signal transmitted by its respective transmitter. Note that each transmitter 20 & 26 may have a unique identification code that is associated with an identification of the object. In this instance, each transmitter 20 & 26 transmits its respective signal in a time, frequency, and/or code division multiplexed manner using approximately the same carrier frequency or frequencies. In another instance, each transmitter 20 & 26 may be assigned a unique frequency of a plurality of frequencies, which it uses to transmit its signal.

Once an object's position is determined, the locating device 12 tracks its motion. For example, the locating device may determine the position of the object within a positioning tolerance (e.g., within a meter) at a positioning update rate (e.g., once every second or once every few seconds) and tracks the motion within a motion tracking tolerance (e.g., within a few millimeters) at a motion tracking update rate (e.g., once every 10-100 milliseconds).

Figure 4:
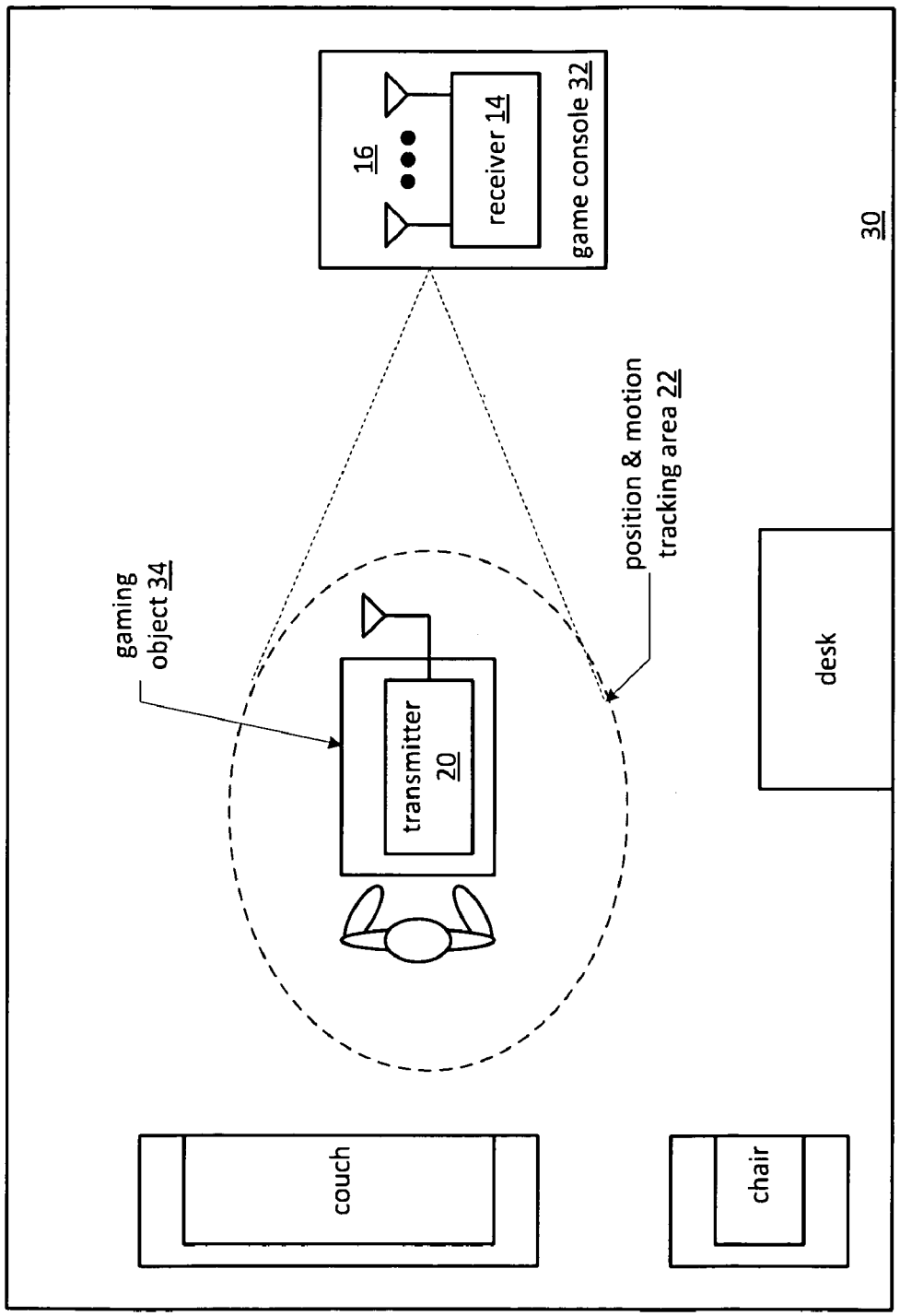
FIG. 4 is a schematic block diagram of an overhead view of an embodiment of a video gaming system in accordance with the present invention.

FIG. 4 is a schematic block diagram of an overhead view of an embodiment of a video gaming system 30 that includes a game console device 32 and a gaming object 34 associated with a player. The video game console device 32 includes the receiver 14 and the gaming object includes the transmitter 20. The video gaming system is within a gaming environment, which may be a room, portion of a room, and/or any other space where the gaming object and the game console device can be proximally co-located (e.g., airport terminal, on a bus, on an airplane, etc.).

In operation, the game console device 32 determines the gaming environment. This may be done by sweeping the area with one or more signals within one or more frequency bands. For example, the one or more signals may be in the ultrasound frequency band of 20 KHz to 200 MHz, the radio frequency band of 30 HZ to 3 GHz, the microwave frequency band of 3 GHz to 300 GHz, the infrared (IR) frequency band of 300 GHz to 428 THz, the visible light frequency band of 428 THz to 750 THz ($n\times10^{12}$), the ultraviolet radiation frequency band of 750 THz to 30 PHz ($n\times10^{15}$), and/or the X-Ray frequency band of 30 PHz to 30 EHz ($n\times10^{18}$).

The determination of the gaming environment continues with the gaming console device 32 measuring at least one of: reflection of the one or more signals, absorption of the one or more signals, refraction of the one or more signals, pass through of the one or more signals, angle of incident of the one or more signals, backscattering of the one or more signals, magnetization induced by the one or more signals to produce measured signal effects, and/or signals transmitted by the transmitter 20. The game console device 32 then identifies different objects based on the measured signal effects (e.g., inanimate objects have different reflective, absorption, pass through, and/or refractive properties of the one or more signals than animate beings) and/or the transmitted signal by the transmitter 20.

The game console device 32 then determines distance of the different objects with respect to itself. From this data, the game console device generates a three-dimensional topographic map of the area in which the video gaming system resides to produce the gaming environment. In this example, the gaming environment includes the player, the gaming object, a couch, a chair, a desk, the four encircling walls, the floor, and the ceiling.

Having determined the gaming environment, the game console device maps the gaming environment to a coordinate system (e.g., a three-dimensional Cartesian coordinate system $[x, y, x]$, a spherical coordinate system $[\rho, \phi, \theta]$, etc.). The game console device 12 then determines the position of the player and/or the gaming object, which includes a transmitter, within the gaming environment in accordance with the coordinate system.

Once the gaming object's position is determined, the game console device tracks the motion of the player and/or the gaming object. For example, the game console device may determine the position of the gaming object and/or the player within a positioning tolerance (e.g., within a meter) at a positioning update rate (e.g., once every second or once every few seconds) and tracks the motion within a motion tracking tolerance (e.g., within a few millimeters) at a motion tracking update rate (e.g., once every 10-100 milliseconds).

During play of a video game, the game console device 12 receives a gaming object response regarding a video game function from the gaming object. The gaming object may be a wireless game controller and/or any object used or worn by the player to facilitate play of a video game. For example, the gaming object 34 may be a simulated sword, a simulated gun, a helmet, a vest, a hat, shoes, socks, pants, shorts, gloves, etc.

The game console device 32 integrates the gaming object response and the motion of the player and/or the gaming object with the video game function. For example, if the video game function corresponds to a video tennis lesson (e.g., a ball machine feeding balls), the game console device tracks the motion of the player and the associated gaming object 34 (e.g., a simulated tennis racket) and maps the motion with the feeding balls to emulate a real tennis lesson. The motion, which includes direction and velocity, enables the game console device 32 to determine how the tennis ball is being struck. Based on how it is being struck, the game console device 12 determines the ball's path and provides a video representation thereof.

Figure 5:
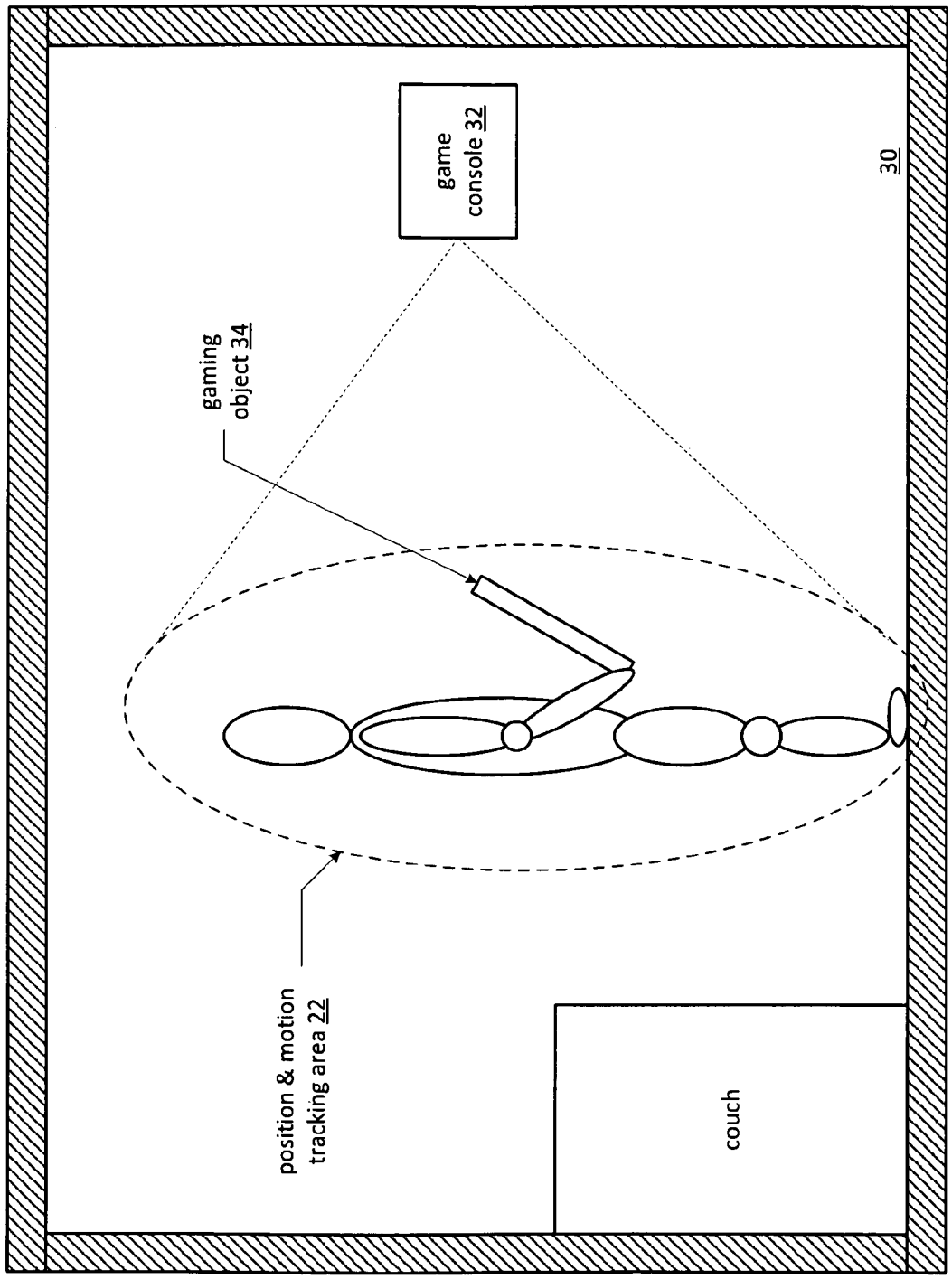
FIG. 5 is a schematic block diagram of a side view of an embodiment of a video gaming system in accordance with the present invention.

FIG. 5 is a schematic block diagram of a side view of an embodiment of the video gaming system 30 of FIG. 4 to illustrate that the position and motion tracking are done in three-dimensional space. Since the game console device does three-dimensional positioning and motion tracking, the initial distance and/or angle of the gaming object and/or player to the game console device is a negligible factor. As such, the gaming system provides accurate motion tracking of the gaming object and/or player, which may be used to map the player's movements to a graphics image for true interactive video game play.

Figure 6:
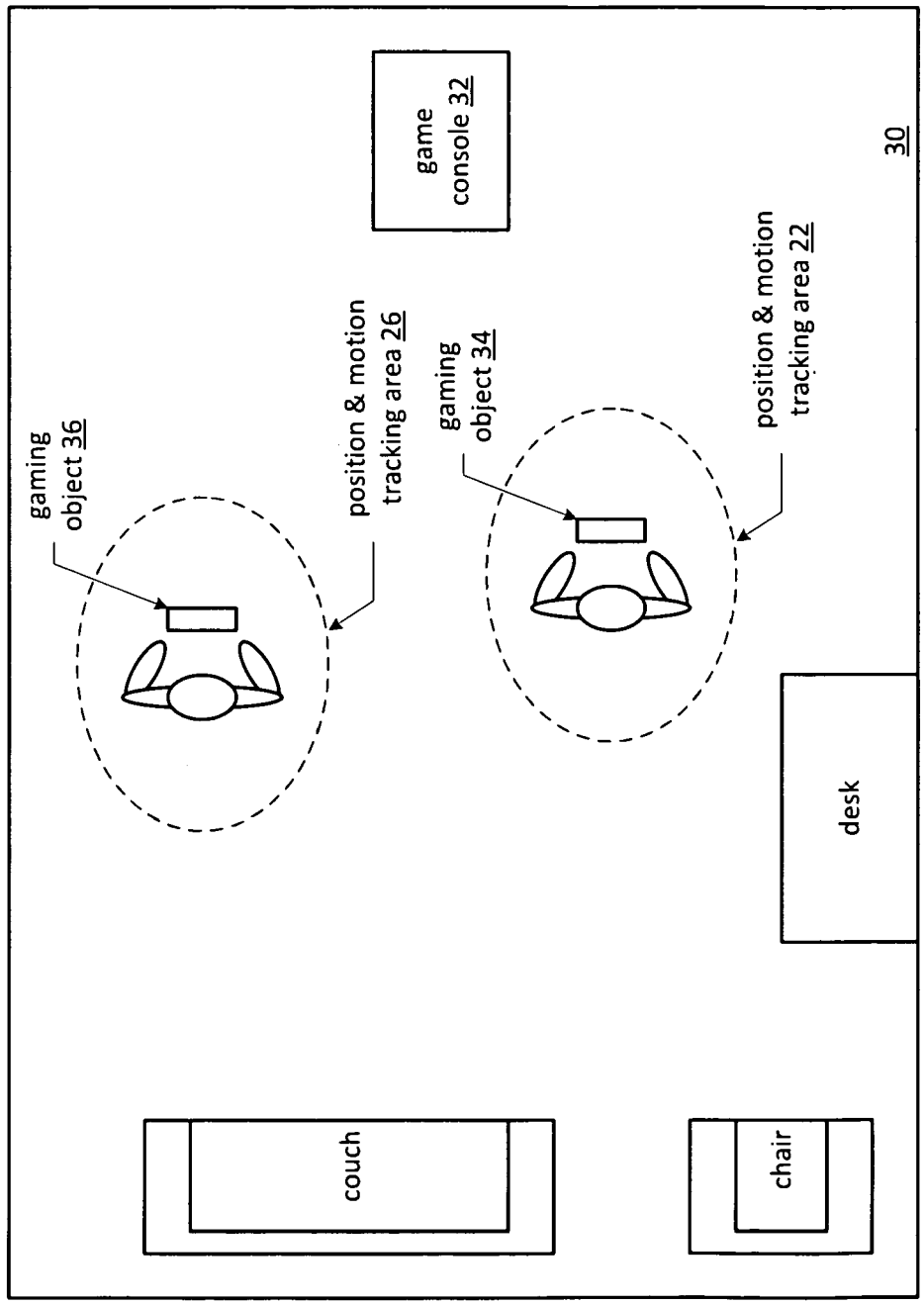
FIG. 6 is a schematic block diagram of an overhead view of another embodiment of a video gaming system in accordance with the present invention.

FIG. 6 is a schematic block diagram of an overhead view of another embodiment of a video gaming system 30 that includes a game console device 32, a plurality of players and a plurality of gaming objects 34 & 36; each of which includes a transmitter 20. In this system, the game console device 32 determines the position of the first player and/or the associated gaming object 34 within the gaming environment in accordance with the coordinate system. The game console device also determines the position of the second player and/or the associated gaming object 36 within the gaming environment in accordance with the coordinate system.

The game console device 32 separately tracks the motion of the first player, the motion of the first associated gaming object 34, the motion of the second player, and the motion of the second associated gaming object 36. While tracking the motion of the players and/or gaming objects, the game console may receive a gaming object response regarding the video game function from the first and/or the second associated gaming object.

The game console device 32 integrates the first and/or second gaming object response, the motion of the first player, the motion of the second player, the motion of the first associated gaming object 34, and the motion of the second associated gaming object 34 with the video game function. While the present example shows two players and associated gaming objects 34 & 36, more than two players and associated gaming objects could be in the gaming environment. In this instance, the game console device separately determines the position and the motion of the players and the associated gaming objects as previously discussed and integrates their play in the video gaming graphics being displayed.

Figure 7:
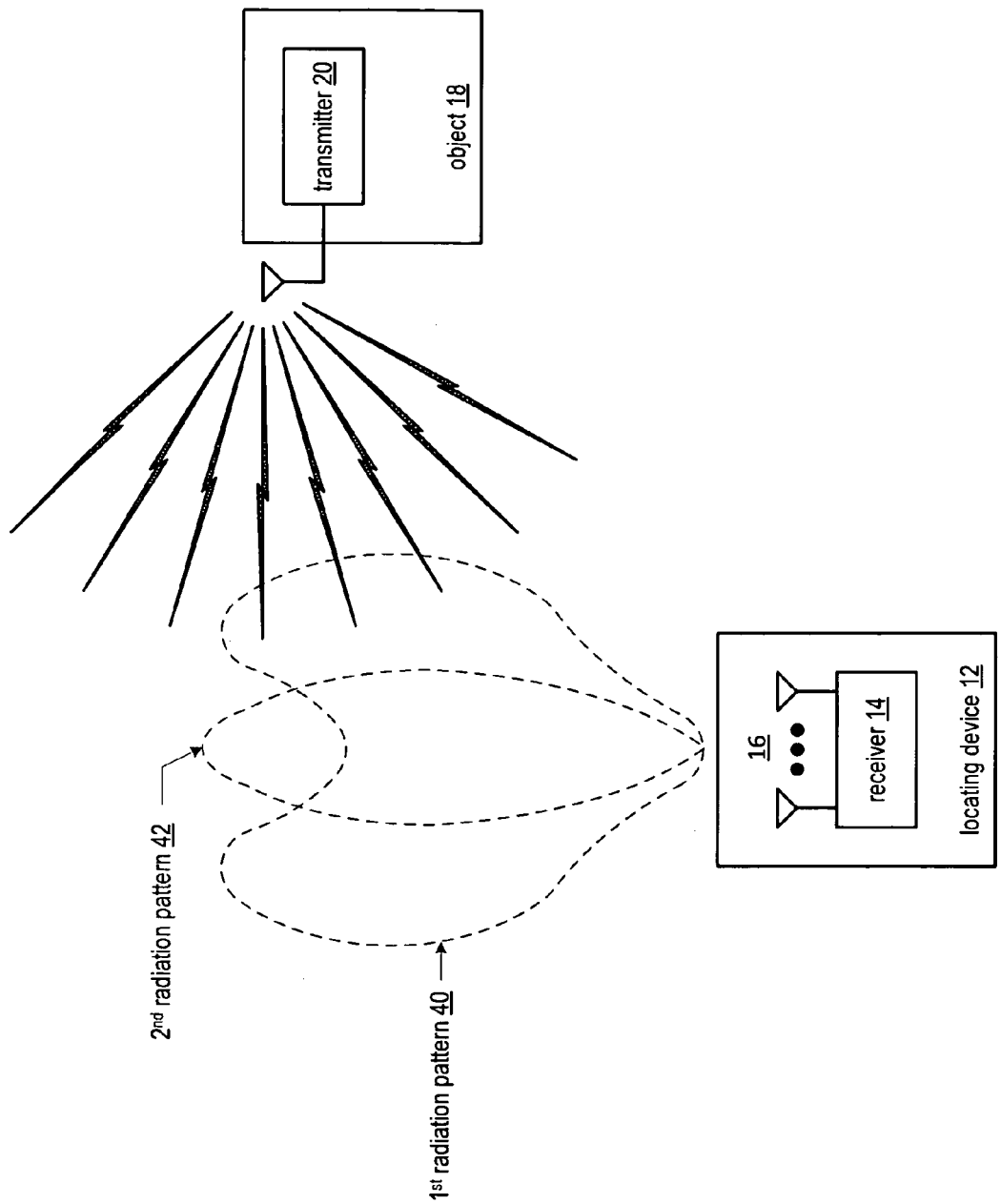
FIG. 7 is a schematic block diagram of another embodiment of a location system in accordance with the present invention.

FIG. 7 is a schematic block diagram of another embodiment of a location system that includes the locating device 12 and an object 18. The locating device includes a receiver 14 and the object includes the transmitter 20. In this example, the transmitter 20 transmits a beacon signal (e.g., a continuous wave signal) via an omni-directional antenna or one or more directional antennas. The beacon signal may be in the RF frequency band and/or in the millimeter wave (MMW) frequency band.

The receiver 13 includes an antenna 16 (which includes a plurality of antennas) and circuitry (which will be described with reference to FIGS. 15-23) to create a first antenna radiation pattern 40 and a second antenna radiation pattern 42. As shown, the radiation patterns may partially overlap and collectively provide a broader area of coverage than a single antenna radiation pattern. For example, the first radiation pattern 40 may be a sum pattern and the second radiation pattern 42 may be a difference pattern.

Via the antenna array, the receiver 14 receives the beacon signal from the transmitter 20. The receiver 14 interprets how the beacon signal is received with respect to each antenna radiation pattern to determine the angular location of the transmitter 20 and, hence, the object with respect to the receiver 14. The distance between the transmitter 20 and receiver 14 may be determined by interpreting one or more of amplitude, phase, and frequency of the received signal with known properties of the transmitted signal as described in co-pending patent application U.S. patent application Ser. No. 12/125,154, entitled VIDEO GAMING SYSTEM WITH POSITION AND MOTION TRACKING, having a filing date of May 22, 2008, pending.

Figure 7A:
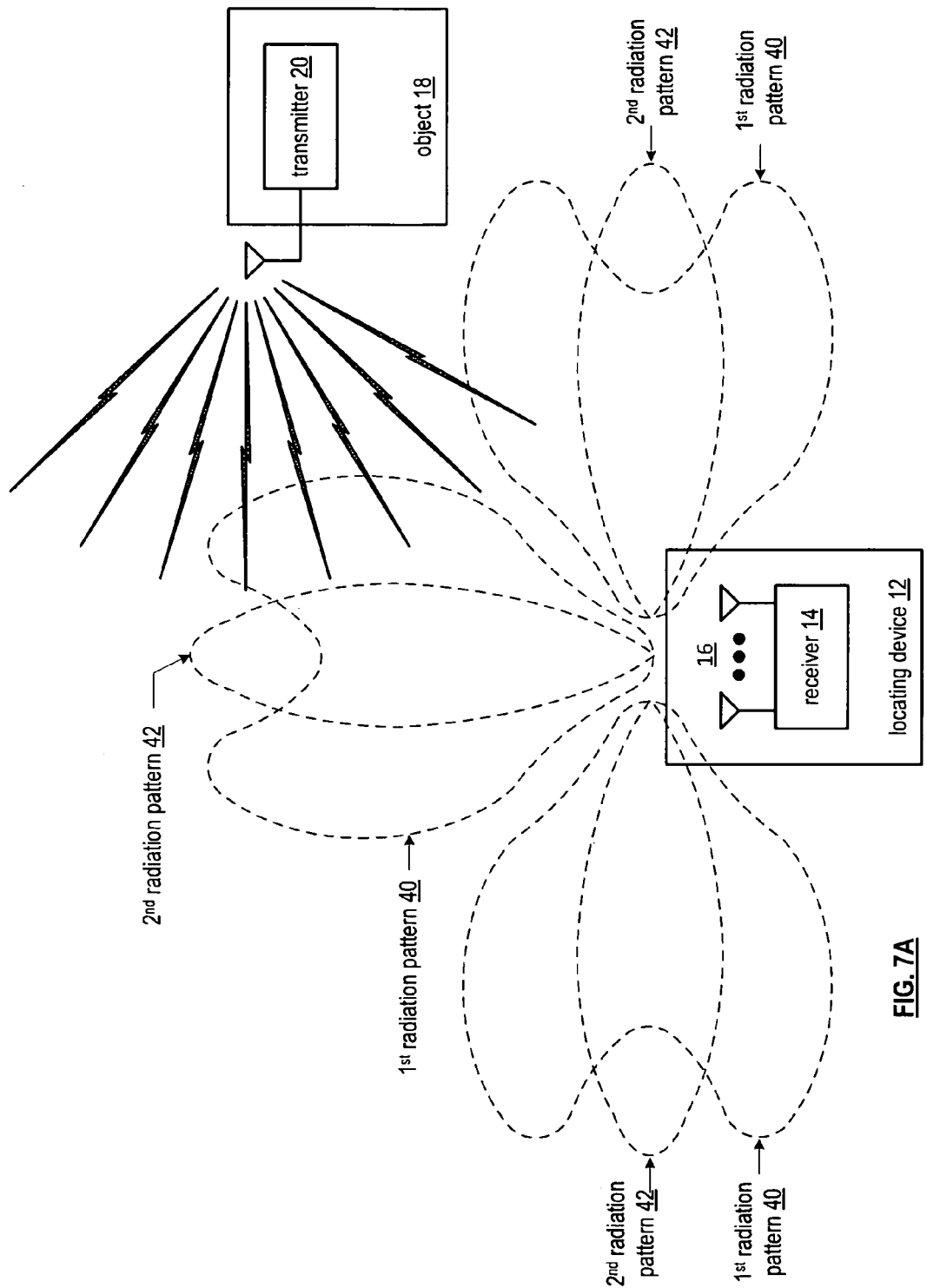
FIG. 7A is a schematic block diagram of another embodiment of a location system in accordance with the present invention.

FIG. 7A is a schematic block diagram of another embodiment of a location system that includes the locating device 12, which includes the receiver 14, and an object 18, which includes the transmitter 20. In this example, the transmitter transmits a beacon signal via an omni-directional antenna or one or more directional antennas. The beacon signal may be in the RF frequency band and/or in the MMW frequency band.

The receiver 14 includes the antenna array and to create a plurality of first and second antenna radiation patterns 40 and 42. As shown, the radiation patterns 40 & 42 may partially overlap and collectively provide a broader area of coverage than a single antenna radiation pattern. Each pair of radiation patterns 40 & 42 may be created in a serial fashion (e.g., one at a time) or in a parallel fashion (e.g., two or more patterns simultaneously).

Via the antenna array, the receiver 14 receives the beacon signal from the transmitter 20 and interprets how the beacon signal is received with respect to each antenna radiation pattern to determine the angular location of the transmitter 20 and, hence, the object. The distance between the transmitter and receiver may be determined by interpreting one or more of amplitude, phase, and frequency of the received signal with known properties of the transmitted signal as discussed in co-pending patent application U.S. patent application Ser. No. 12/125,154, entitled VIDEO GAMING SYSTEM WITH POSITION AND MOTION TRACKING, having a filing date of May 22, 2008, pending.

FIGS. 8-10 are diagrams of an embodiment of a three-dimensional Cartesian coordinate system of a localized physical area that may be used for a location and/or gaming system. In these figures an x-y-z origin is selected to be somewhere in the localized physical area and the position and motion of the player and/or the object is determined with respect to the origin (e.g., 0, 0, 0). For example, a point (e.g., x1, y1, z1) on the object is used to identify its position in the environment. As the player object moves, its new position is identified within the gaming environment and the relation between the old point and the new point is used to determine three-dimensional motion.

FIGS. 11-13 are diagrams of an embodiment of a spherical coordinate system of a localized physical area that may be used for a location and/or gaming system. In these figures an origin is selected to be somewhere in the localized physical area and the position and motion of the object is determined with respect to the origin. For example, the position of the object may be represented as vector, or spherical coordinates, $(\rho, \phi, \theta)$, where $\rho \geq 0$ and is the distance from the origin to a given point P; $0 \leq \phi \leq 180°$ and is the angle between the positive z-axis and the line formed between the origin and P; and $0 \leq \theta \leq 360°$ and is the angle between the positive x-axis and the line from the origin to P projected onto the xy-plane. In general, $\phi$ is referred to as the zenith, co-latitude or polar angle, $\theta$ is referred to as the azimuth, $\phi$ and $\theta$ loses significance when $\rho=0$ and $\theta$ loses significance when $\sin(\phi)=0$ (at $\phi=0$ and $\phi=180°$). A point is plotted from its spherical coordinates, by going $\rho$ units from the origin along the positive z-axis, rotate $\phi$ about the y-axis in the direction of the positive x-axis and rotate $\theta$ about the z-axis in the direction of the positive y-axis.

For example, a point (e.g., $\rho 1, \phi 1, \theta 1$) on the object is used to identify its position in the environment. As the object moves, its new position is identified within the gaming environment and the relation between the old point and the new point is used to determine three-dimensional motion. While FIGS. 8-13 illustrate two types of coordinate system, any three-dimensional coordinate system may be used for tracking motion and/or establishing position within a gaming system.

Figure 14:
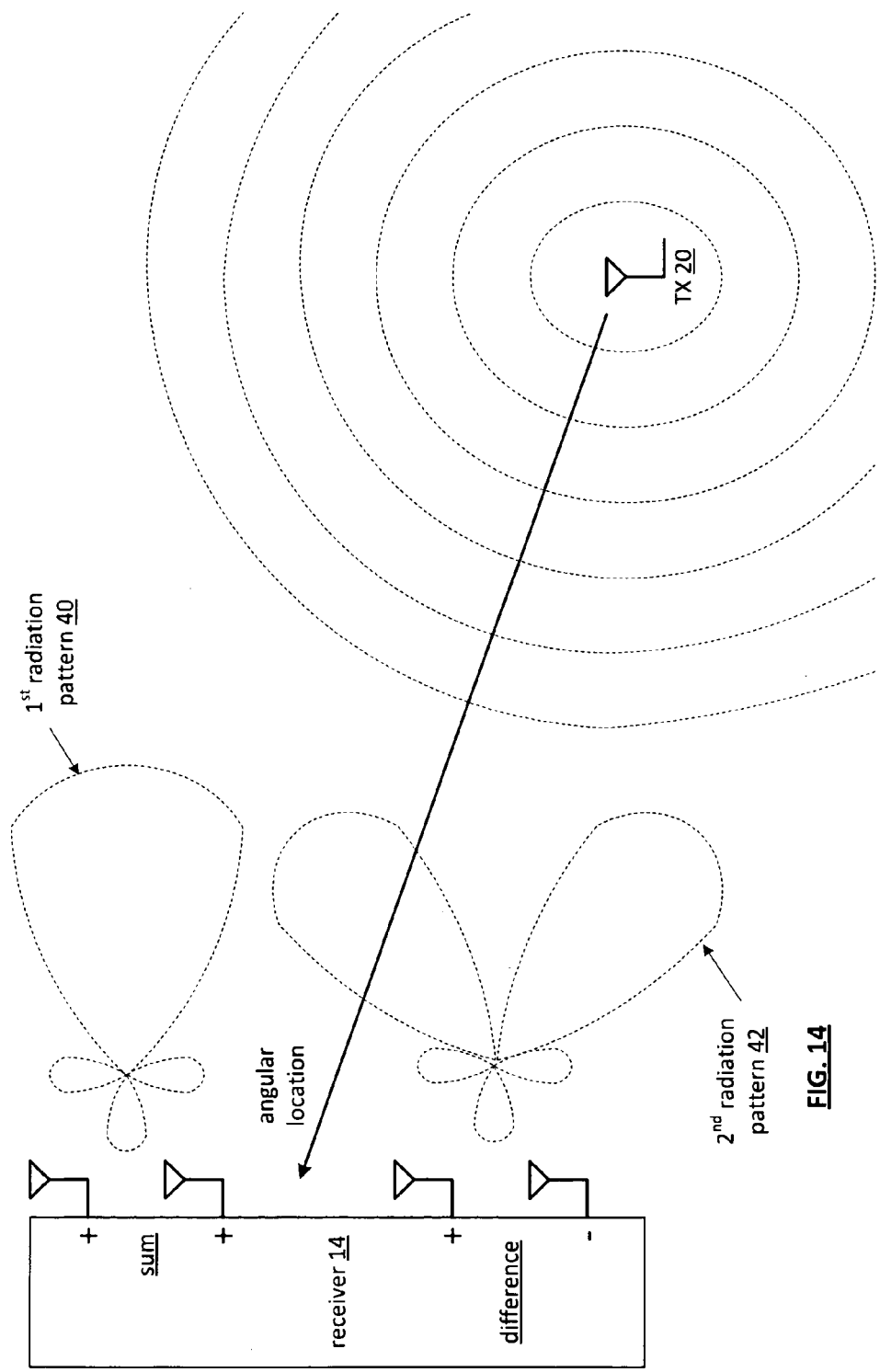
FIG. 14 is a schematic block diagram of an example of a location system in accordance with the present invention.

FIG. 14 is a schematic block diagram of an example of a location system 10 that includes the receiver 14 and the transmitter (TX) 20, of which only an antenna is shown. In this example, the transmitter 20 is transmitting a signal (e.g., a beacon signal (e.g., a continuous wave signal), a video game request or response, etc.) via an omni-directional antenna. The receiver 14 receives the signal via the antennas of an antenna array 16 in two distinct patterns 40 and 42. For example, the receiver 14 may include circuitry such that the antennas receive the signal in a sum pattern and the second and a difference pattern. Note that the sum and difference patterns are shown separately for illustrative purposes, but, in practice, they are essentially superimposed.

In this example, let RX_A represent the signal received by a first one of the antennas, RX_B represent the signal received by a second one of the antennas, RX_C represent the signal received by a third one of the antennas, and RX_D represent the signal received by a fourth one of the antennas. The circuitry of the receiver produces the sum pattern, and hence a sum signal, by adding the received signals together (e.g., RX_A+RX_B+RX_C+RX_D) and produces the difference pattern, and hence a difference signal, by a performing a difference function (e.g., RX_A+RX_B−RX_C−RX_D).

The sum and difference signals are combined, or used independently, to identify the angular location of, and track the motion of, the object associated with the transmitter 20. Having identified the angular location, the antenna radiation pattern of the receiver may be adjusted in accordance with the angular location to improve reception of the transmitted signal.

Figure 15:
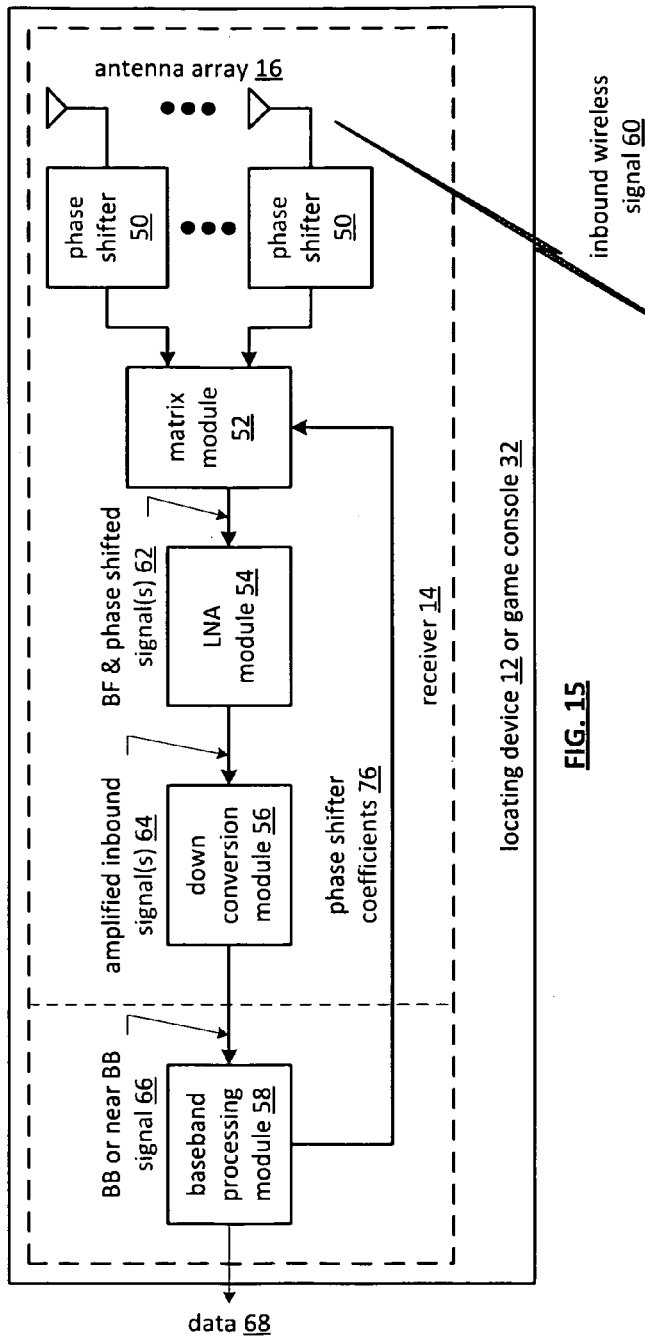
FIG. 15 is a schematic block diagram of an embodiment of a location device or gaming console in accordance with the present invention.

FIG. 15 is a schematic block diagram of an embodiment of a location device 12 or gaming console 32 that includes a receiver 14. The receiver 14 includes an antenna array 16, a plurality of phase shifters 50, a matrix module 52, a low noise amplifier module 54, a down conversion module 56, and may further include a baseband processing module 58. The antenna array 16 may be a linear array or circular array that includes two or more antennas of like or different construct (e.g., di-pole, monopole, helical, meandering trace, etc.). The low noise amplifier module 52 includes one or more low noise amplifiers coupled in series and/or parallel. Note that the receiver 14 may be implemented using one or more integrated circuit circuits that contain the phase shifters 50, the low noise amplifier module 52, the down conversion module 54, and may further include the baseband processing module 56.

The baseband processing module 56 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-23.

In an example of operation, the antenna array 16 receives an inbound wireless signal 58 from the transmitter 20. The inbound wireless signal 58 may be in accordance with one or more wireless communication standards or a proprietary communication protocol. In addition, the inbound wireless signal 58 may have a carrier frequency in the radio frequency (RF) frequency range and/or in the millimeter wave (MMW) frequency range. The antennas of the antenna array are implemented as a linear array (or a circular antenna array) and have a frequency response center frequency approximately equal to the carrier frequency of the inbound wireless signal 58.

Figure 23:
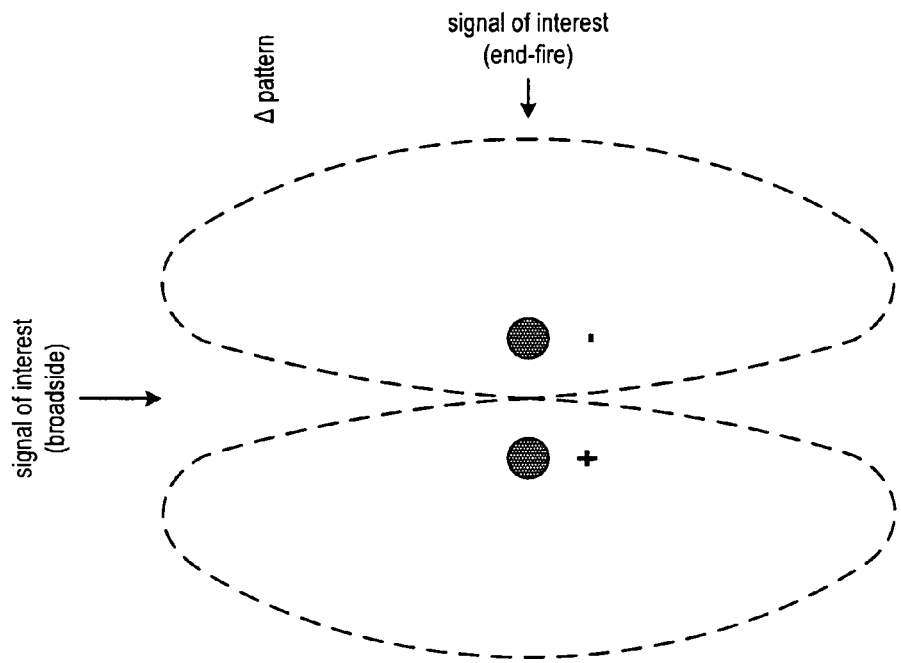
FIG. 23 is a diagram of an example of an end-fire antenna pattern in accordance with the present invention
Figure 22:
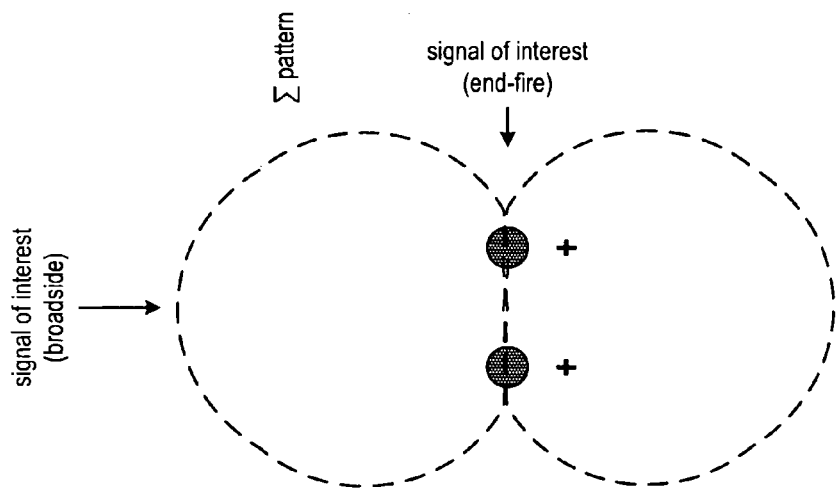
FIG. 22 is a diagram of an example of a broadside antenna pattern in accordance with the present invention.

The antenna array 16 may have pairs of its antennas configured in an end-fire manner as shown in FIG. 23. As shown in FIG. 23, two antennas are excited via different polarities (e.g., 180° of out phase) to produce the end-fire pattern. This produces a wider radiation pattern than a broadside pattern as shown in FIG. 22 (e.g., two antennas are excited via the same polarity) for a signal of interest (e.g., the transmitted signal). Alternatively, the antenna array may have its antennas arranged in a broadside manner to produce the first and second radiation patterns 40 and 42 or arranged in a combination of end-fire and broadside to produce the first and second radiation patterns 40 and 42.

Returning to the discussion of FIG. 15, the plurality of phase shifters 50 phase shifts the inbound wireless signal 58 received via the antenna array 16 to produce a plurality of phase shifted inbound wireless signals. Each of the phase shifters 50 may a 1-bit phase shifter or a 2-bit phase shifter. In this manner, the amount of phase shifting performed by each phase shifter is limited to $2^1$ or $2^2$ different phases, which may be fine phase adjustments (e.g., less than 30° per bit) or coarse adjustments (e.g., greater than 30° per bit).

The matrix module 52 beamforms the plurality of phase shifted inbound wireless signals to produce a plurality of beamformed and phase shifted inbound wireless signals 62. In general, the matrix module 52 separates, in phase, the plurality of phase shifted inbound wireless signals such that the resulting beamformed and phase shifted inbound wireless signals are spaced in frequency. For example, if the antenna array includes six antennas and there are six phase shifters 50, then the phase shifters produce six phase shifted inbound wireless signals. The matrix module 62 takes each of the six phase shifted inbound wireless signals and correspondingly centers them on sixty degree offsets.

Figure 17:
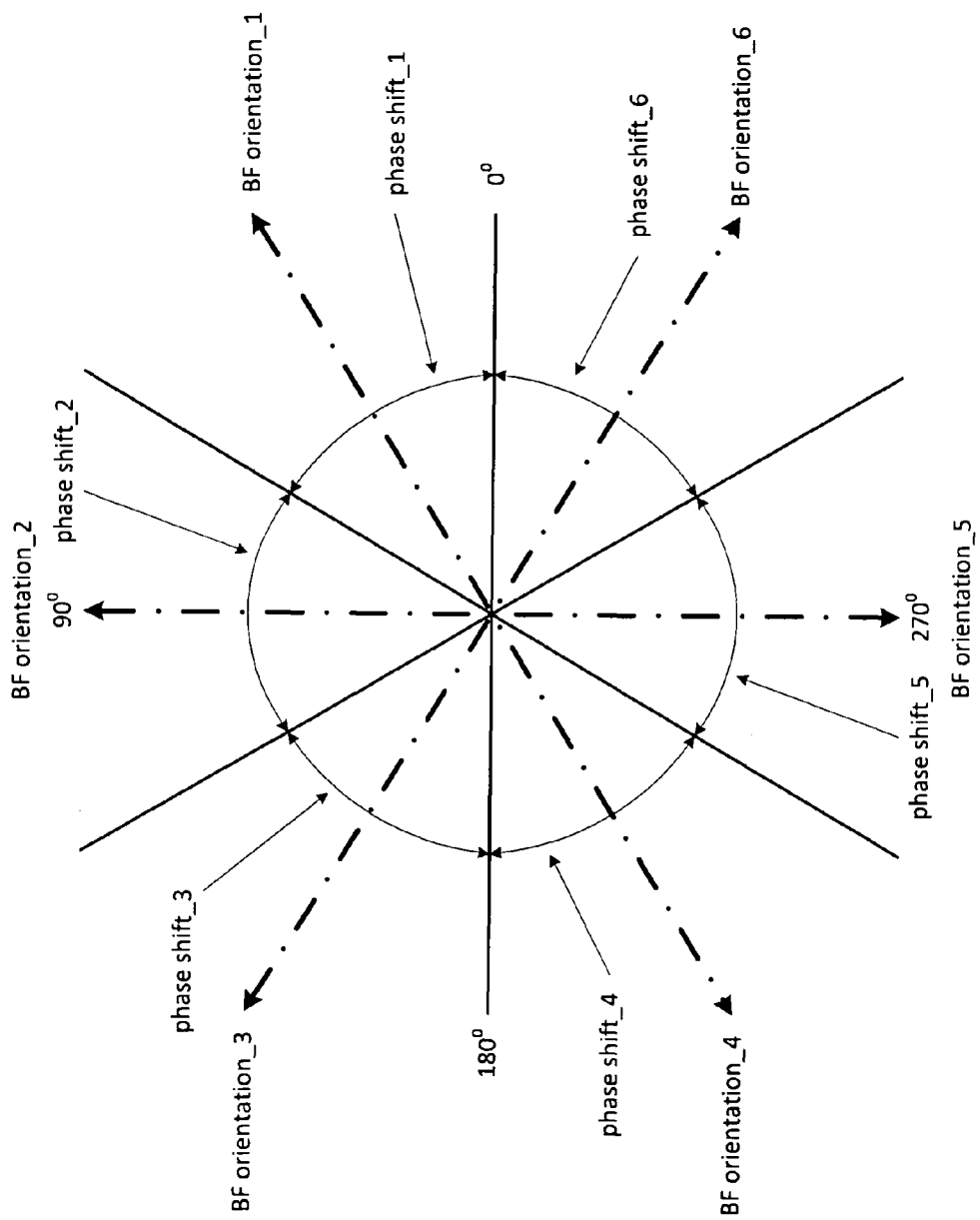
FIG. 17 is a diagram of an example of multiple beamforming orientations and corresponding phase shifts in accordance with the present invention.

As an illustration of this example, refer to FIG. 17 where a two-dimensional radiant coordinate system is divided into six beamforming orientations (1-6). Such a division is done by the matrix module 52. For each beamforming orientation, a corresponding phase shift is associated therewith. As such, each of the six inbound wireless signals received by the antenna array in this example is beamform orientated and phase shifted such that the full spectrum is covered using 1 or 2-bit phase shifters. In this manner, the phase shifters are much lower resolution (e.g., 1 or 2-bits) than phase shifters (e.g., 6 or 7 bits) used in sum/difference antenna pattern location schemes.

The low noise amplifier module 52 amplifies the BF and phase shifted inbound wireless signal or signals 62 to produce an amplified inbound wireless signal 64. The down conversion module 54 converts the amplified inbound RF signal(s)

into a baseband or near baseband signal 66 (e.g., a carrier frequency of DC to a few MHz). In an embodiment, the down conversion module 54 mixes in-phase (I) and quadrature (Q) components of the amplified inbound RF signal with in-phase and quadrature components of receiver local oscillation to produce a mixed I signal and a mixed Q signal. The mixed I and Q signals are combined to produce the signal 66. In an embodiment, the signal 66 includes phase information (e.g., $\pm\Delta\theta$ [phase shift] and/or $\theta(t)$ [phase modulation]) and/or frequency information (e.g., $\pm\Delta f$ [frequency shift] and/or $f(t)$ [frequency modulation]). In another embodiment and/or in furtherance of the preceding embodiment, the inbound RF signal(s) include amplitude information (e.g., $\pm\Delta A$ [amplitude shift] and/or $A(t)$ [amplitude modulation]). To recover the amplitude information, the down conversion module further includes an amplitude detector such as an envelope detector, a low pass filter, etc.

The baseband processing module 56 converts the baseband or near baseband signal 66 into inbound data 68 (e.g., video game user inputs, video game outputs, digital audio signals, digital video signals, graphics signals, etc.). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling.

The baseband processing module 56 may also interpret the baseband or near baseband signal, the conversion of the baseband or near baseband signal 66, the inbound data 68, and/or other factors regarding the signal integrity of the inbound wireless signals (e.g., received signal strength indication, bit error rate, signal to noise ratio, signal to interference ratio, etc.) to determine phase shifter coefficients 76. The phase shifter coefficients are provided to the phase shifters 50, which adjust their phase shifting accordingly.

Figure 16:
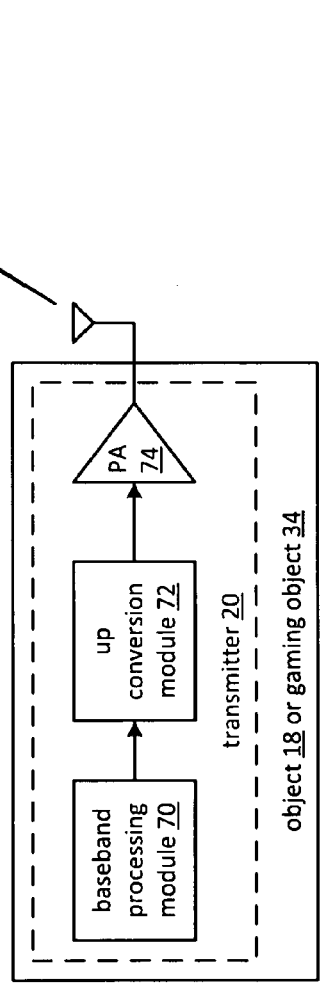
FIG. 16 is a schematic block diagram of an embodiment of an object or gaming object in accordance with the present invention.

FIG. 16 is a schematic block diagram of an embodiment of an object 18 or gaming object 34 that includes the transmitter 20. The transmitter 20 includes a baseband processing module 70, an up conversion module 72, and a power amplifier module (PA) 74, which is coupled to one or more antennas.

In an example of operation, the baseband processing module 70 converts outbound data (e.g., a beacon signal, video game user inputs, video game outputs, digital audio signals, digital video signals, graphics signals, etc.) into an outbound symbol stream. Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion.

The up conversion module 72 converts the outbound symbol stream into one or more outbound RF signals that has a carrier frequency within a given frequency band (e.g., 1800 MHz, 2.4 GHz, 5 GHz, 57-66 GHz, etc.). The power amplifier module 74, which includes one or more power amplifier drivers and/or power amplifiers coupled in series and/or in parallel, amplifies the one or more outbound wireless signals 58, which are subsequently transmitted via the antenna(s).

In an embodiment, the up conversion module 72 mixes the outbound symbol stream with a local oscillation to produce an up-converted signal. One or more power amplifiers and/or power amplifier drivers amplifies the up-converted signal, which may be RF bandpass filtered, to produce the outbound RF signal(s). In another embodiment, the up conversion module 72 includes an oscillator that produces an oscillation. The outbound symbol stream provides phase information (e.g., $\pm\Delta\theta$ [phase shift] and/or $\theta(t)$ [phase modulation]) that adjusts the phase of the oscillation to produce a phase adjusted RF signal(s), which is transmitted as the outbound RF signal(s). In another embodiment, the outbound symbol stream includes amplitude information (e.g., $A(t)$ [amplitude modulation]), which is used to adjust the amplitude of the phase adjusted RF signal to produce the outbound RF signal.

In yet another embodiment, the up conversion module 72 includes an oscillator that produces an oscillation. The outbound symbol provides frequency information (e.g., $\pm\Delta f$ [frequency shift] and/or $f(t)$ [frequency modulation]) that adjusts the frequency of the oscillation to produce a frequency adjusted RF signal(s), which is transmitted as the outbound RF signal(s). In another embodiment, the outbound symbol stream includes amplitude information, which is used to adjust the amplitude of the frequency adjusted RF signal to produce the outbound RF signal(s). In a further embodiment, the up conversion module includes an oscillator that produces an oscillation. The outbound symbol provides amplitude information (e.g., $\pm\Delta A$ [amplitude shift] and/or $A(t)$ [amplitude modulation]) that adjusts the amplitude of the oscillation to produce the outbound RF signal(s).

Figure 18:
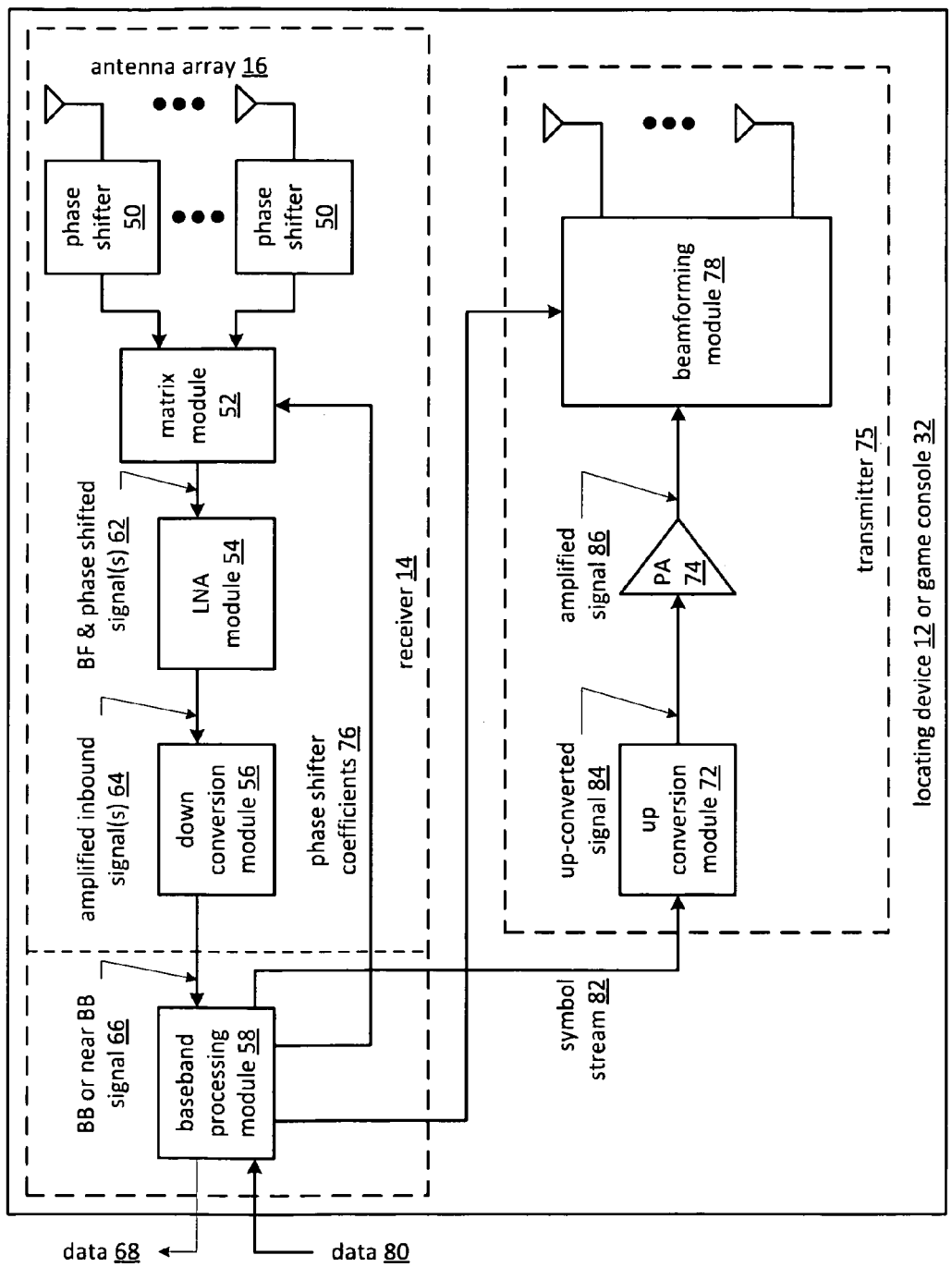
FIG. 18 is a schematic block diagram of another embodiment of a location device or gaming console in accordance with the present invention.

FIG. 18 is a schematic block diagram of another embodiment of a location device 12 or gaming console 32 that includes the receiver 14 and a transmitter 75. The transmitter 75 includes an up-conversion module 72, a power amplifier module 74, and a beamforming module 76. In this embodiment, the receiver 14 functions as previously described.

In an example of operation of the transmitter 75, the baseband processing module 56 converts outbound data 78 into an outbound symbol stream 80. This may be done in a manner as previously discussed with reference to the baseband processing module 70 of FIG. 16. The up-conversion module 72 converts the symbol stream 80 into an upconverted signal 82 and the power amplifier module 74 amplifies the upconverted signal 82 to produce an amplified signal 84 in a manner as discussed with reference to FIG. 16.

The beamforming module 76, if included, generates a plurality of phase offset wireless signals from the amplified signal 84. The antenna array transmits the phase offset wireless signals to produce, in air, a beamformed signal. Note that the antenna array of the transmitter 75 may be a separate antenna array from array 16 or may be the same array. In the latter case, the transmitter 75 and receiver 14 are sharing the antenna array 16.

Figure 19:
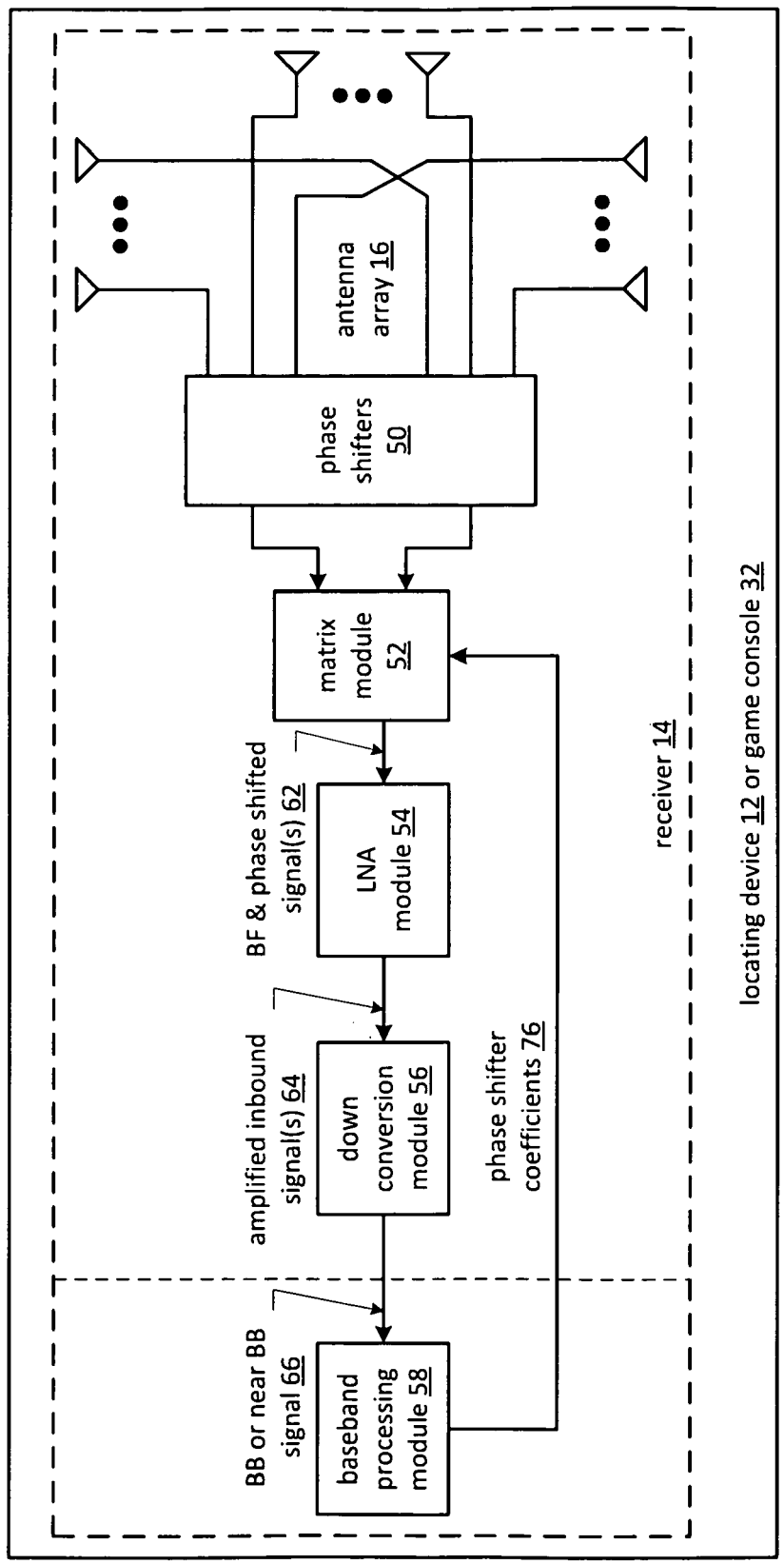
FIG. 19 is a schematic block diagram of another embodiment of a location device or gaming console in accordance with the present invention.

FIG. 19 is a schematic block diagram of another embodiment of a location device 12 or gaming console 32 that includes the receiver 14. The receiver includes the antenna arrays 16, the phase shifters 50, the low noise amplifier module 52, and the down conversion module 54. The antenna array 16 includes at least two sets of antennas, where each set has a different polarization (e.g., 0°, 90°, 180°, and/or 270°, clockwise and counterclockwise, etc.) with respect to the other sets.

In an example of operation, the set of antennas may be used separately or in concert. For example, the phase shifters 50 may be coupled to receive the inbound wireless signals from a first set of antennas and process the signals as described above. Next, the phase shifters 50 are coupled to receive the inbound wireless signals from a second set of the antennas and process the signals. This continues for the remaining sets.

As another example, the phase shifters 50 may receive the inbound wireless signal from each set of the antennas. The received signals are processed as described above.

Figure 20:
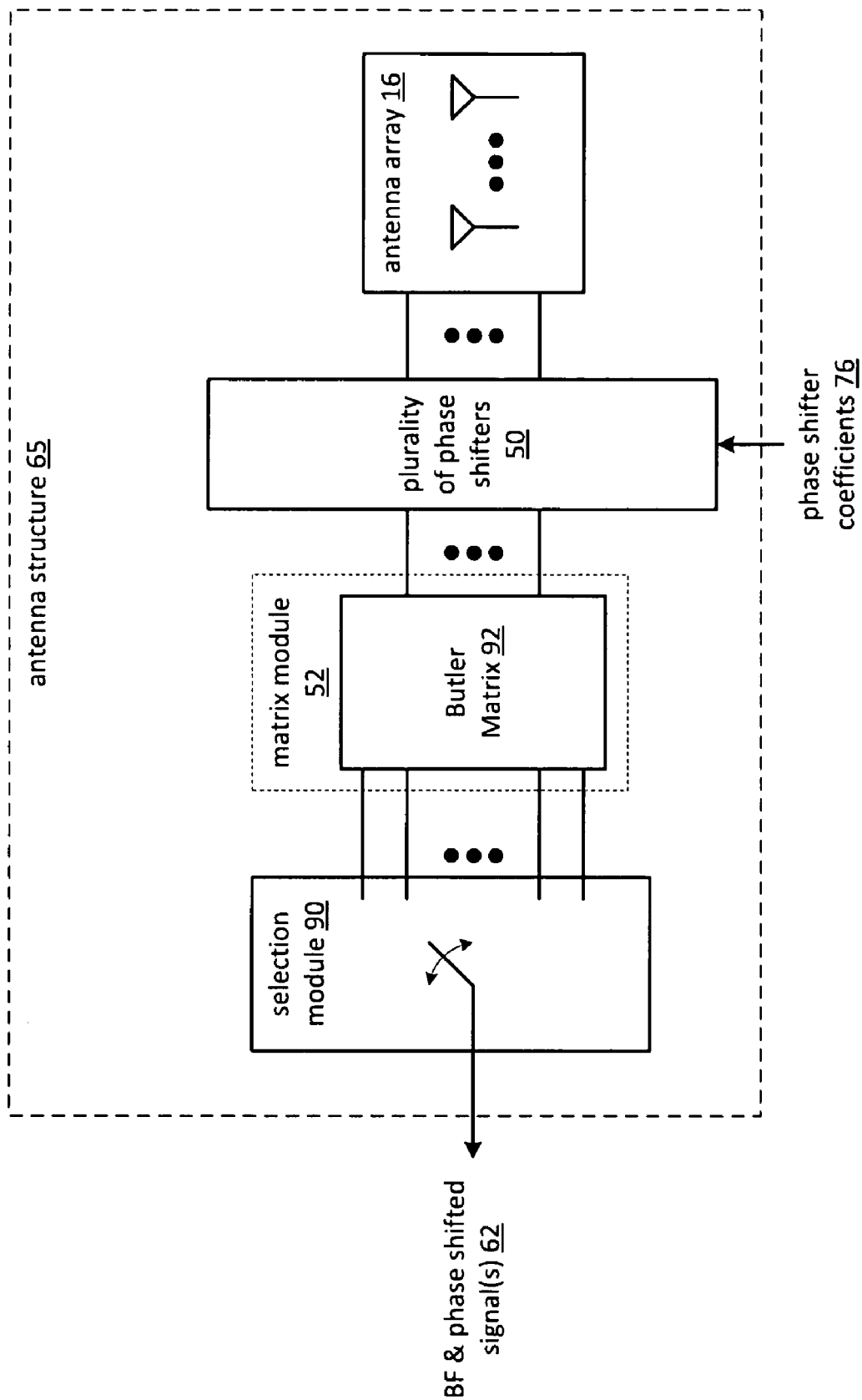
FIG. 20 is a schematic block diagram of an embodiment of an antenna structure in accordance with the present invention.

FIG. 20 is a schematic block diagram of an embodiment of an antenna structure 65 that includes the antenna array 16, the plurality of phase shifters 50, the matrix module 52, and a selection module 90. The matrix module 52 may be implemented via one or more Butler matrixes 92. As is known, a Butler matrix consists of passive four-port hybrid power dividers and fixed phase shifters and has the same number of output ports as it does input ports. In general, the Butler matrix produces N orthogonally space beams overlapping at a −3.9 dB level and have the full gain of the array.

In an example of operation, the antenna array 16 receives an inbound wireless signal and produced a plurality of received inbound wireless signals. The plurality of phase shifters 50 phase shift the inbound wireless signals based on phase shifter coefficients 76 to produce a plurality of phase shifted inbound wireless signals. The matrix module 52, via one or more Butler matrixes 92, beamforms the plurality of phase shifted inbound wireless signals to produce a plurality of beamformed and phase shifted inbound wireless signals.

The selection module 90 outputs one or more of the plurality of beamformed and phase shifted inbound wireless signals 62. The selection module 90 may be a high frequency switch that receives a selection input from the baseband processing module 56 or other control module. In general, the selection module 90 is configured to output the beamformed and phase shifted signal 62 having the highest signal strength properties. In other words, the combination of the beamforming and phase shifting has a radiation pattern that is aligned with the angular position of the source transmitting the inbound wireless signal with respect to the receiver 14.

Figure 21:
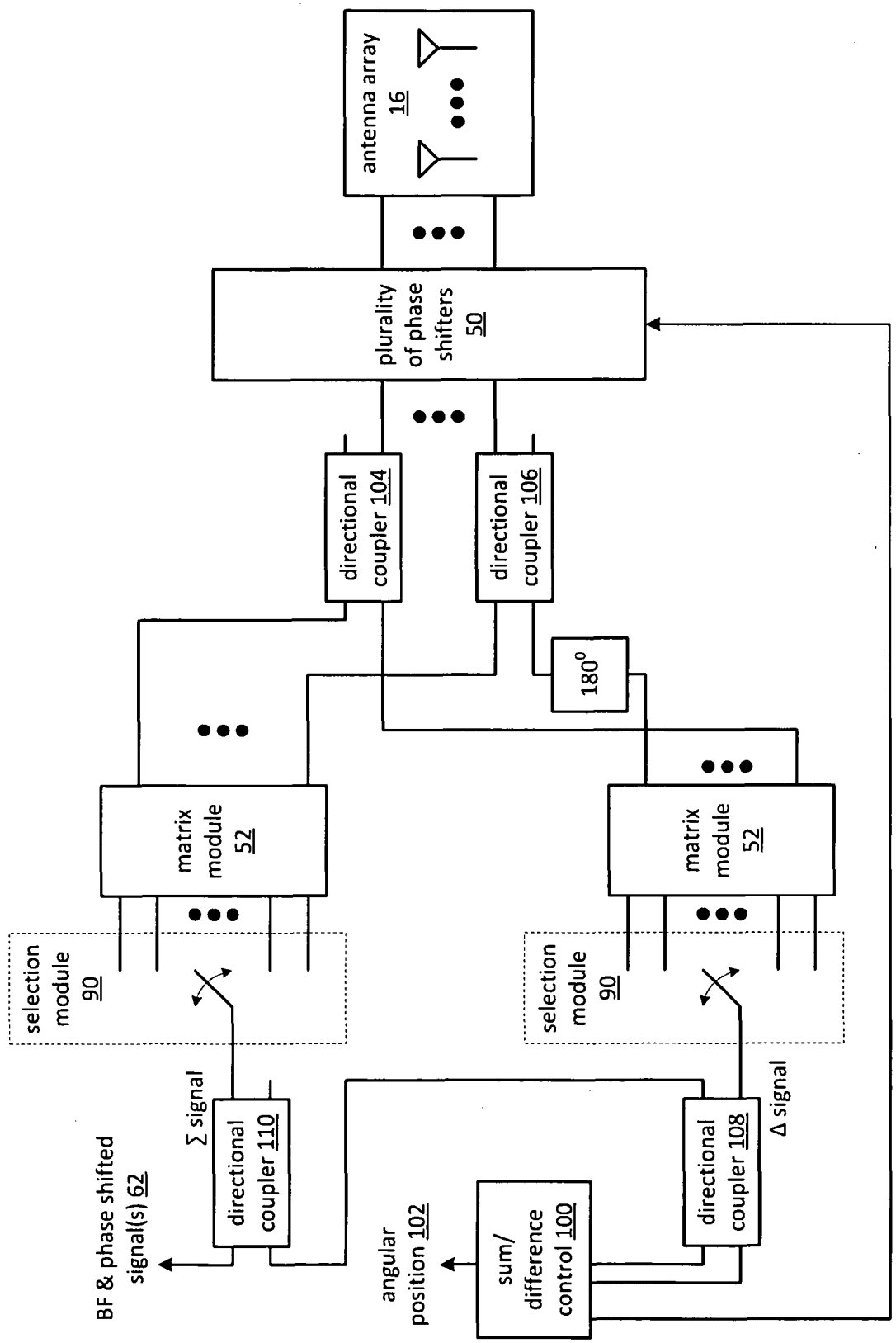
FIG. 21 is a schematic block diagram of an embodiment of a portion of a receiver in accordance with the present invention.

FIG. 21 is a schematic block diagram of an embodiment of a portion of a receiver 14 that includes the antenna array 16, the plurality of phase shifters 50, a plurality of matrix modules 52 (which may be Butler matrixes), a plurality of selection modules 90, a plurality of directional couplers 104-110, an inverter (180°), and a sum/difference control unit 100. Each of the matrix modules 52 includes a combination of 90° hybrids and phase shifters to perform a spatial fast Fourier transform and provide one or more pairs of orthogonal beams. The beams may overlap and can cover a sector of up to 360°.

In an example of operation, the antenna array 16 receives an inbound wireless signal and produces, therefrom, a plurality of received inbound RF signals. Depending on the physical distance and angle of each antenna with respect to the source, each of the plurality of received inbound wireless signals may be the same or different. The phase shifters 50, which may be 1 or 2 bit phase shifters, adjust the phase of each of the plurality of received inbound wireless signals based on phase shifter coefficients 76 to produce a plurality of phase shifted inbound RF signals.

The directional couplers 104-106 and the inverter provide the phase shifted inbound RF signals to the matrix modules 52, which produces beamformed and phase shifted inbound wireless signals. Each of the selection modules 90 selects one of the beams produced by the corresponding matrix module 52. A first one of the selection modules 90 provides the selected beamformed and phase shifted inbound wireless signal as a sum signal (Σ signal). A second one of the selection modules 90 provides the selected beamformed and phase shifted inbound wireless signal as a difference signal (Δ signal). The sum signal is provided as an output to the LNA module 54 via directional coupler 110.

The sum/difference control unit 100 receives the sum signal and the difference signal via directional couplers 108 and 110. From these signals, the sum/difference control unit 100 determines an angular position 102 of the source of the inbound wireless signal. The control unit 100 may provide the phase shifter coefficients to the phase shifters 50 and may further provide a control signal to each of the selection modules 90 to indicate which of the outputs of the matrix modules 90 to select.

As an example, let RX_A represent the signal received by a first one of the antennas, RX_B represent the signal received by a second one of the antennas, RX_C represent the signal received by a third one of the antennas, and RX_D represent the signal received by a fourth one of the antennas. The receiver produces the sum signal by adding the received signals together (e.g., RX_A+RX_B+RX_C+RX_D) and produces the difference signal by a performing a difference function (e.g., RX_A+RX_B−RX_C−RX_D). The sum and difference signals are combined, or used independently, to identify the angular location of, and track the motion of, the sources of the wireless signal (e.g., transmitter 20).

As another example, assume that the antenna array includes two antennas having a physical separation. Further assume that the inbound wireless signal may be represented as $A(t)*\cos(\omega_{RF}+\Phi(t))$, where the inbound RF signal received by the first antenna may be expressed as $A_1(t)*\cos(\omega_{RF}+\Phi_1(t))$ and the inbound RF signal received by the second antenna may be expressed as $A_2(t)*\cos(\omega_{RF}+\Phi_2(t))$. A first phase shifter adjusts the phase of the first inbound RF signal by a first phase adjust ($\theta_1$) to produce a first phase adjusted signal $A_1(t)*\cos(\omega_{RF}+\Phi_1(t)+\theta_1)$. A second phase shifter adjusts the phase of the second inbound RF signal by a second phase adjust ($\theta_2$) to produce a second phase adjusted signal $A_2(t)*\cos(\omega_{RF}+\Phi_2(t)+\theta_2)$.

Each of the matrix modules 52 creates a plurality of beamformed and phase shifted inbound wireless signals. For instance, each matrix module 52 takes the first phase shifted signals $A_1(t)*\cos(\omega_{RF}+\Phi_1(t)+\theta_1)$ and produces (assuming 4 beamforming orientations) $A_1(t)*\cos(\omega_{RF}+\Phi_1(t)+\theta_1)$, $A_1(t)*\cos(\omega_{RF}+\Phi_1(t)+\theta_1+\pi/2)$, $A_1(t)*\cos(\omega_{RF}+\Phi_1(t)+\theta_1+\pi)$ and $A_1(t)*\cos(\omega_{RF}+\Phi_1(t)+\theta_1+3\pi/2)$. Each matrix module 52 does the same thing for the other phase shifted signals.

The first selection module 90 that outputs the sum signal is provided a control signal to select the beamformed and phase shifted signal from the matrix module 90 that best approximates RX_A+RX_B+RX_C+RX_D. The second selection module 90 that outputs the difference signal is provided a control signal to select the beamformed and phase shifted signal that best approximates RX_A+RX_B−RX_C−RX_D.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An antenna structure comprises:
   an antenna array operably coupled to receive an inbound wireless signal;
   a plurality of phase shifters operably coupled to the antenna array and to produce a plurality of phase shifted inbound wireless signals;
   a matrix module operably coupled to beamform the plurality of phase shifted inbound wireless signals to produce a plurality of beamformed and phase shifted inbound wireless signals;
   a selection module operably coupled to output the one or more of the plurality of beamformed and phase shifted inbound wireless signals;
   a direction coupling module operable to generate a representation of the plurality of phase shifted inbound wireless signals;
   an inversion module operably coupled to invert a phase shifted inbound wireless signal of the representation of the plurality of phase shifted inbound wireless signal to produce an inverted phase shifted inbound wireless signal;
   a second matrix module operably coupled to beamform the inverted phase shifted inbound wireless signal and remaining phase shifted inbound wireless signals of the representation of the plurality of phase shifted inbound wireless signals to produce a second plurality of beamformed and phase shifted inbound wireless signals; and
   a control module to determine an angular position of a source of the inbound wireless signal based on at least one of the plurality of beamformed and phase shifted inbound wireless signals and at least one of the second plurality of beamformed and phase shifted inbound wireless signals.

2. The antenna structure of claim 1, wherein each of the plurality of phase shifters comprises:
   a 1-bit phase shifter; or
   a 2-bit phase shifter.

3. The antenna structure of claim 1, wherein the antenna array comprises:
   a linear antenna array.

4. The antenna structure of claim 1, wherein the matrix module comprises:
   a Butler matrix.

5. A receiver comprises:
   an antenna array operably coupled to receive an inbound wireless signal;
   a plurality of 1-bit or 2-bit phase shifters operably coupled to the antenna array and to produce a plurality of phase shifted inbound wireless signals;
   a first matrix module operably coupled to beamform the plurality of phase shifted inbound wireless signals to produce a plurality of beamformed and phase shifted inbound wireless signals;
   a direction coupling module operable to generate a representation of the plurality of phase shifted inbound wireless signals;
   an inversion module operably coupled to invert a phase shifted inbound wireless signal of the representation of the plurality of phase shifted inbound wireless signal to produce an inverted phase shifted inbound wireless signal;
   a second matrix module operably coupled to beamform the inverted phase shifted inbound wireless signal and remaining phase shifted inbound wireless signals of the representation of the plurality of phase shifted inbound wireless signals to produce a second plurality of beamformed and phase shifted inbound wireless signals; and
   a control module to determine an angular position of a source of the inbound wireless signal based on the one or more of the plurality of beamformed and phase shifted inbound wireless signals and one or more of the second plurality of beamformed and phase shifted inbound wireless signals;
   a low noise amplifier module operably coupled to amplify one or more of the plurality of beamformed and phase shifted inbound wireless signals to produce one or more amplified inbound signals; and
   a down conversion module operably coupled to convert the one or more amplified inbound wireless signals into one or more baseband or near baseband signals.

6. The receiver of claim 5 further comprises:
   a first selection module operably coupled to output the one or more of the plurality of beamformed and phase shifted inbound wireless signals to the low noise amplifier module and to the control module; and
   a second selection module operably coupled to output the one or more of the second plurality of beamformed and phase shifted inbound wireless signals to the control module.

7. The receiver of claim 6 further comprises the control module operably coupled to:

generate a first control signal for the first selection modules, wherein the first control signal indicates outputting of the one or more of the plurality of beamformed and phase shifted inbound wireless signals; and generate a second control signal for the second selection modules, wherein the second control signal indicates outputting of the one or more of the second plurality of beamformed and phase shifted inbound wireless signals.

8. The receiver of claim 5 further comprises the control module operably coupled to:

generate coefficients for the plurality of 1-bit or 2-bit phase shifters.

9. The receiver of claim 5, wherein the antenna array comprises:

a linear antenna array.

10. The receiver of claim 5, wherein each of the first and second matrix modules comprises:

a Butler matrix.

* * * * *